US012445901B2

(12) United States Patent
Cheng et al.

(10) Patent No.: US 12,445,901 B2
(45) Date of Patent: Oct. 14, 2025

(54) CONGESTION CONTROL BY A SIDELINK MIDLAYER FRAMEWORK

(71) Applicant: Qualcomm Incorporated, San Diego, CA (US)

(72) Inventors: Hong Cheng, Basking Ridge, NJ (US); Shailesh Patil, San Diego, CA (US); Dan Vassilovski, Del Mar, CA (US); Lan Yu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 628 days.

(21) Appl. No.: 17/782,959

(22) PCT Filed: Jan. 3, 2020

(86) PCT No.: PCT/CN2020/070217
§ 371 (c)(1),
(2) Date: Jun. 6, 2022

(87) PCT Pub. No.: WO2021/134775
PCT Pub. Date: Jul. 8, 2021

(65) Prior Publication Data
US 2023/0007528 A1 Jan. 5, 2023

(51) Int. Cl.
*H04W 28/02* (2009.01)
(52) U.S. Cl.
CPC ... *H04W 28/0289* (2013.01); *H04W 28/0284* (2013.01)
(58) Field of Classification Search
CPC .................. H04W 28/0289; H04W 28/0284
See application file for complete search history.

(56) References Cited

U.S. PATENT DOCUMENTS

2012/0167162 A1* 6/2012 Raleigh ................. H04M 15/00
726/1
2016/0034131 A1* 2/2016 Kosaka ............... G06F 3/04883
715/765
(Continued)

FOREIGN PATENT DOCUMENTS

CN 107040959 A 8/2017
WO WO-2017052690 A1 3/2017
(Continued)

OTHER PUBLICATIONS

Ericsson: "Congestion Control in V2X Sidelink", 3GPP TSG-RAN WG2 #94, R2-164106, vol. RAN WG2, No. Nanjing, China, Agenda 8.2.3, May 23, 2016-May 27, 2016, 7 Pages, May 13, 2016, XP051105423, [retrieved on May 22, 2016], The Whole Document.
(Continued)

Primary Examiner — Ajay Cattungal
(74) Attorney, Agent, or Firm — Holland & Hart LLP

(57) ABSTRACT

Methods, systems, and devices for wireless communications are described. In some cases, an application enabler layer (e.g., a vehicle-to-everything (V2X) application enabler (VAE) layer), may identify a congestion control configuration that includes capabilities for collecting operation information. The application enabler layer may receive, from a set of user equipment (UEs), the operation information in accordance with the capabilities. Then, the application enabler layer may generate congestion control instructions for one or more UEs of the set of UEs based on the received operation information. Additionally or alternatively, an application enabler architecture layer (e.g., a service enabler architecture layer for verticals (SEAL)) may identify a congestion control configuration including capabilities for collecting operation information and monitor sidelink performance for the set of UEs in accordance with the capabilities. The application enabler architecture layer may iden-
(Continued)

tify a congestion status for a communication type based on monitoring the sidelink performance.

31 Claims, 14 Drawing Sheets

(56) References Cited

U.S. PATENT DOCUMENTS

| | | | |
|---|---|---|---|
| 2017/0188232 A1* | 6/2017 | Raleigh | H04L 63/083 |
| 2017/0201461 A1 | 7/2017 | Cheng et al. | |
| 2018/0242190 A1 | 8/2018 | Khoryaev et al. | |
| 2019/0141573 A1 | 5/2019 | Boström et al. | |
| 2019/0261222 A1* | 8/2019 | Raleigh | H04W 28/10 |
| 2020/0404069 A1* | 12/2020 | Li | H04L 67/59 |

FOREIGN PATENT DOCUMENTS

| | | |
|---|---|---|
| WO | WO-2017176329 A1 | 10/2017 |
| WO | WO-2018085726 A1 | 5/2018 |
| WO | WO-2018113947 A1 | 6/2018 |
| WO | WO-2019149182 A1 | 8/2019 |

OTHER PUBLICATIONS

Huawei et al., "Congestion Control for Uu and PC5 based V2X Transmission", 3GPP TSG-RAN WG2 Meeting #94, R2-163808, 3rd Generation Partnership Project, Mobile Competence Centre, 650, Route Des Lucioles, F-06921 Sophia-Antipolis, vol. RAN WG2, No. Nanjing, China, May 3, 2016-May 27, 2016, 4 Pages, May 14, 2016, XP051095348, p. 1-p. 4, Figure 2.
Supplementary European Search Report—EP20908920—Search Authority—The Hague—Aug. 9, 2023.
3GPP 3rd Generation Partnership Project, Technical Specification Group Services and System Aspects; Application layer support for Vehicle-to-Everything (V2X) services; Functional architecture and information flows; (Release 16) 3GPP TS 23.286 V16.2.0 (Dec. 2019) Dec. 31, 2019 (Dec. 31, 2019) section 6.2, 62 pages.
3GPP 3rd Generation Partnership Project; Technical Specification Group Services and System Aspects; Study on enhancements to application layer support for V2X services; (Release 17) 3GPP TR 23.764 V0.3.0 (Dec. 2019), Dec. 31, 2019 (Dec. 31, 2019), the whole document, 18 pages.
International Search Report and Written Opinion—PCT/CN2020/070217—ISA/EPO—Sep. 27, 2020.

* cited by examiner

CONGESTION CONTROL BY A SIDELINK MIDLAYER FRAMEWORK

CROSS REFERENCE

The present Application is a 371 national stage filing of International PCT Application No. PCT/CN2020/070217 by Cheng et al., entitled "CONGESTION CONTROL BY A SIDELINK MIDLAYER FRAMEWORK," filed Jan. 3, 2020, which is assigned to the assignee hereof, and which is expressly incorporated by reference in its entirety herein.

FIELD OF TECHNOLOGY

The following relates generally to wireless communications and more specifically to congestion control by a sidelink midlayer framework.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support sidelink communications (e.g., vehicle-to-vehicle (V2V), vehicle-to-everything (V2X) systems, etc.), where a UE may communicate with other UEs on allocated sidelink resources. As information sharing between sidelink devices increases and more UEs use sidelink communications, improved techniques for managing sidelink congestion may be desired for ensuring efficient sidelink service application usage within the system.

SUMMARY

The described techniques relate to improved methods, systems, devices, and apparatuses that support congestion control by a sidelink midlayer framework. Generally, the described techniques provide for the collection and analysis of sidelink communication status in a system to enable a user equipment (UE) or a midlayer at the network (e.g., based on functions associated with the midlayer performed by a server or network node) to better determine if a sidelink communication is experiencing congestion and how to mitigate congestion if present. The congestion monitoring may occur for sidelink resources, for example, sidelink resources used by devices in a vehicle-to-everything (V2X) system. The network midlayers used to monitor and manage congestion may include at least a V2X Application enabler (VAE) layer, a Service Enabler Architecture Layer for Verticals (SEAL) layer, or both.

As described herein, the VAE and SEAL enhanced framework may introduce support for the detection of sidelink congestion as well as the management of the congestion. The described techniques may include the VAE layer understanding and collecting information on one or more applications running at a specific location, among a specific group, for a particular service (e.g., platooning, sensor sharing, or intersection assistance, etc.), and also collect information regarding UE (e.g., vehicle) maneuvers (such as a left turn, right turn, going straight, lane change, merge, etc.). Further, the SEAL layer may manage and monitor resources based on PC5 communication status, PC5 communication statistics, number of unicast links, PC5 quality of service (QoS) information, or the like. Based on the collected information, the VAE layer may determine if a service type may be subject to congestion control according to a determined algorithm. Additionally, based on the collected information, the SEAL layer may also perform analytics to determine if certain type of communication is facing problem or may face a problem in the future, and provides such information to the VAE layer.

The described techniques may support status monitoring and congestion detection when some UEs are not in coverage but communicating with other UEs (e.g., via PC5). In cases were a UE is out of coverage, the VAE may indicate relaying or aggregation of service level status reporting to a UE in coverage, such that out-of-coverage UEs may report congestion information to the in-coverage UE. The VAE may also configure how congestion control instructions may be distributed through the system. Other considerations for the congestion service at the VAE and SEAL include the use of different Public Land Mobile Networks (PLMNs) by different UEs. In such cases, the VAE or SEAL server may be either common or may be placed on the user plane and accessible from different PLMNs. Alternatively, an inter-SEAL server interface can be created, such that an out-of-coverage UE may communicate with its home PLMN (HPLMN) VAE or SEAL server via an in-coverage UE and its corresponding SEAL server. Accordingly, sidelink congestion may be detected and managed efficiently.

A method of wireless communications is described. The method may include identifying, at an application enabler layer, a congestion control configuration including capabilities for collecting operation information, receiving, from a set of user equipments (UEs), the operation information in accordance with the capabilities, and generating congestion control instructions for one or more UEs of the set of UEs based on the received operation information.

An apparatus for wireless communications is described. The apparatus may include a processor, memory coupled with the processor, and instructions stored in the memory. The instructions may be executable by the processor to cause the apparatus to identify, at an application enabler layer, a congestion control configuration including capabilities for collecting operation information, receive, from a set of user equipments (UEs), the operation information in accordance with the capabilities, and generate congestion control instructions for one or more UEs of the set of UEs based on the received operation information.

Another apparatus for wireless communications is described. The apparatus may include means for identifying, at an application enabler layer, a congestion control configuration including capabilities for collecting operation information, receiving, from a set of user equipments (UEs), the operation information in accordance with the capabilities, and generating congestion control instructions for one or more UEs of the set of UEs based on the received operation information.

A non-transitory computer-readable medium storing code for wireless communications is described. The code may include instructions executable by a processor to identify, at an application enabler layer, a congestion control configuration including capabilities for collecting operation information, receive, from a set of user equipments (UEs), the operation information in accordance with the capabilities, and generate congestion control instructions for one or more UEs of the set of UEs based on the received operation information.

Some examples of the method, apparatuses, and non-transitory computer-readable medium described herein may further include operations, features, means, or instructions for transmitting, to a subset of the set of UEs within network coverage, an operation information request, and receiving, from the set of UEs, the operation information based on the operation information request.

In some examples of the method, apparatuses, and non-transitory computer-readable medium described herein, transmitting the operation information request further may include operations, features, means, or instructions for transmitting, to the subset of the set of UEs, a reporting configuration for reporting the operation information, where the reporting configuration includes relay instructions based on a coverage level of each of the set of UEs.

In some examples of the method, apparatuses, and non-transitory computer-readable medium described herein, the reporting configuration includes aggregation instructions associated with the relay instructions.

Some examples of the method, apparatuses, and non-transitory computer-readable medium described herein may further include operations, features, means, or instructions for detecting congestion for a service type based on the received operation information, where the congestion control instructions for the one or more UEs of the set of UEs may be associated with the service type and based on the detected congestion.

Some examples of the method, apparatuses, and non-transitory computer-readable medium described herein may further include operations, features, means, or instructions for transmitting the congestion control instructions to a UE of the set of UEs, the UE being within network coverage.

In some examples of the method, apparatuses, and non-transitory computer-readable medium described herein, transmitting the congestion control instructions further may include operations, features, means, or instructions for transmitting, to the UE, an instruction distribution configuration for relaying the congestion control instructions.

In some examples of the method, apparatuses, and non-transitory computer-readable medium described herein, transmitting the congestion control instructions further may include operations, features, means, or instructions for transmitting, to the UE, an instruction distribution configuration via a user plane, a control plane, system information, radio resource control signaling, or a combination thereof.

Some examples of the method, apparatuses, and non-transitory computer-readable medium described herein may further include operations, features, means, or instructions for receiving, from an application enabler architecture layer, congestion control information for the one or more UEs of the set of UEs, where generating the congestion control instructions for the one or more UEs of the set of UEs may be based on the received congestion control information.

Some examples of the method, apparatuses, and non-transitory computer-readable medium described herein may further include operations, features, means, or instructions for identifying an operation information map based on the received congestion control information, and transmitting, to a subset of the set of UEs within network coverage, an operation information trigger with relay instructions based on the operation information map.

In some examples of the method, apparatuses, and non-transitory computer-readable medium described herein, the operation information includes location specific application information, sidelink group specific information, vehicle-to-everything service specific information, UE movement information, or a combination thereof.

In some examples of the method, apparatuses, and non-transitory computer-readable medium described herein, the congestion control instructions include a message generation rate adjustment, an application communication mode adjustment, a prioritization of lower layer communication types, or a combination thereof.

In some examples of the method, apparatuses, and non-transitory computer-readable medium described herein, the application enabler layer includes a vehicle-to-everything application enabler layer in communication with a common vehicle-to-everything server shared by a set of public land mobile networks or a vehicle-to-everything server on a user plane accessible from each of the set of public land mobile networks.

In some examples of the method, apparatuses, and non-transitory computer-readable medium described herein, identifying, at the application enabler layer, the congestion control configuration including capabilities for collecting operation information in the application enabler layer includes executing instructions associated with the application enabler layer at an application server to identify the congestion control configuration, and the application enabler layer includes a vehicle-to-everything application enabler layer.

A method of wireless communications is described. The method may include identifying, at an application enabler architecture layer, a congestion control configuration including capabilities for collecting operation information, monitoring sidelink performance for a set of user equipments (UEs) in accordance with the capabilities, and identifying a congestion status for a communication type based on monitoring the sidelink performance.

An apparatus for wireless communications is described. The apparatus may include a processor, memory coupled with the processor, and instructions stored in the memory. The instructions may be executable by the processor to cause the apparatus to identify, at an application enabler architecture layer, a congestion control configuration including capabilities for collecting operation information, monitor sidelink performance for a set of user equipments (UEs) in accordance with the capabilities, and identify a congestion status for a communication type based on monitoring the sidelink performance.

Another apparatus for wireless communications is described. The apparatus may include means for identifying, at an application enabler architecture layer, a congestion control configuration including capabilities for collecting operation information, monitoring sidelink performance for a set of user equipments (UEs) in accordance with the capabilities, and identifying a congestion status for a communication type based on monitoring the sidelink performance.

A non-transitory computer-readable medium storing code for wireless communications is described. The code may include instructions executable by a processor to identify, at an application enabler architecture layer, a congestion control configuration including capabilities for collecting operation information, monitor sidelink performance for a set of user equipments (UEs) in accordance with the capabilities, and identify a congestion status for a communication type based on monitoring the sidelink performance.

Some examples of the method, apparatuses, and non-transitory computer-readable medium described herein may further include operations, features, means, or instructions for managing sidelink operations for the communication type based on identifying the congestion status.

Some examples of the method, apparatuses, and non-transitory computer-readable medium described herein may further include operations, features, means, or instructions for transmitting, to an application enabler layer, congestion control information for one or more UEs of the set of UEs based on identifying the congestion status.

Some examples of the method, apparatuses, and non-transitory computer-readable medium described herein may further include operations, features, means, or instructions for receiving, from the application enabler layer, congestion control instructions for the one or more UEs of the set of UEs based on transmitting the congestion control information.

In some examples of the method, apparatuses, and non-transitory computer-readable medium described herein, the congestion control instructions includes a prioritization of lower layer communication types.

In some examples of the method, apparatuses, and non-transitory computer-readable medium described herein, the congestion control information includes a lower layer communication type.

In some examples of the method, apparatuses, and non-transitory computer-readable medium described herein, identifying the congestion status of the communication type further may include operations, features, means, or instructions for identifying potential congestion of the communication type based on a prediction based on monitoring the sidelink performance, and transmitting, to an application enabler layer, congestion control information for one or more UEs of the set of UEs based on identifying the potential congestion status.

In some examples of the method, apparatuses, and non-transitory computer-readable medium described herein, monitoring the sidelink performance of the set of UEs further may include operations, features, means, or instructions for receiving, from a UE of the set of UEs, one or more sidelink status reports, where the UE relays the one or more sidelink status reports from one or more out of coverage UEs of the set of UEs.

In some examples of the method, apparatuses, and non-transitory computer-readable medium described herein, the one or more sidelink status reports includes aggregated status reports from each UE of the set of UEs.

Some examples of the method, apparatuses, and non-transitory computer-readable medium described herein may further include operations, features, means, or instructions for identifying a status information map based on monitoring the sidelink performance, and transmitting, to a subset of the set of UEs within network coverage, a performance information request with relay instructions based on the status information map.

In some examples of the method, apparatuses, and non-transitory computer-readable medium described herein, the sidelink performance includes sidelink communication status, sidelink communication statistics, sidelink quality of service information, or a combination thereof.

In some examples of the method, apparatuses, and non-transitory computer-readable medium described herein, the application enabler layer includes a vehicle-to-everything application enabler layer in communication with a common vehicle-to-everything server shared by a set of public land mobile networks or a vehicle-to-everything server on a user plane accessible from each of the set of public land mobile networks.

In some examples of the method, apparatuses, and non-transitory computer-readable medium described herein, identifying, at the application enabler architecture layer, the congestion control configuration including capabilities for collecting operation information in the application enabler architecture layer includes executing instructions associated with the application enabler architecture layer at an application server to identify the congestion control configuration, and the application enabler architecture layer includes a service enabler architecture layer for verticals including an inter-server interface.

DETAILED DESCRIPTION

Figure 1:
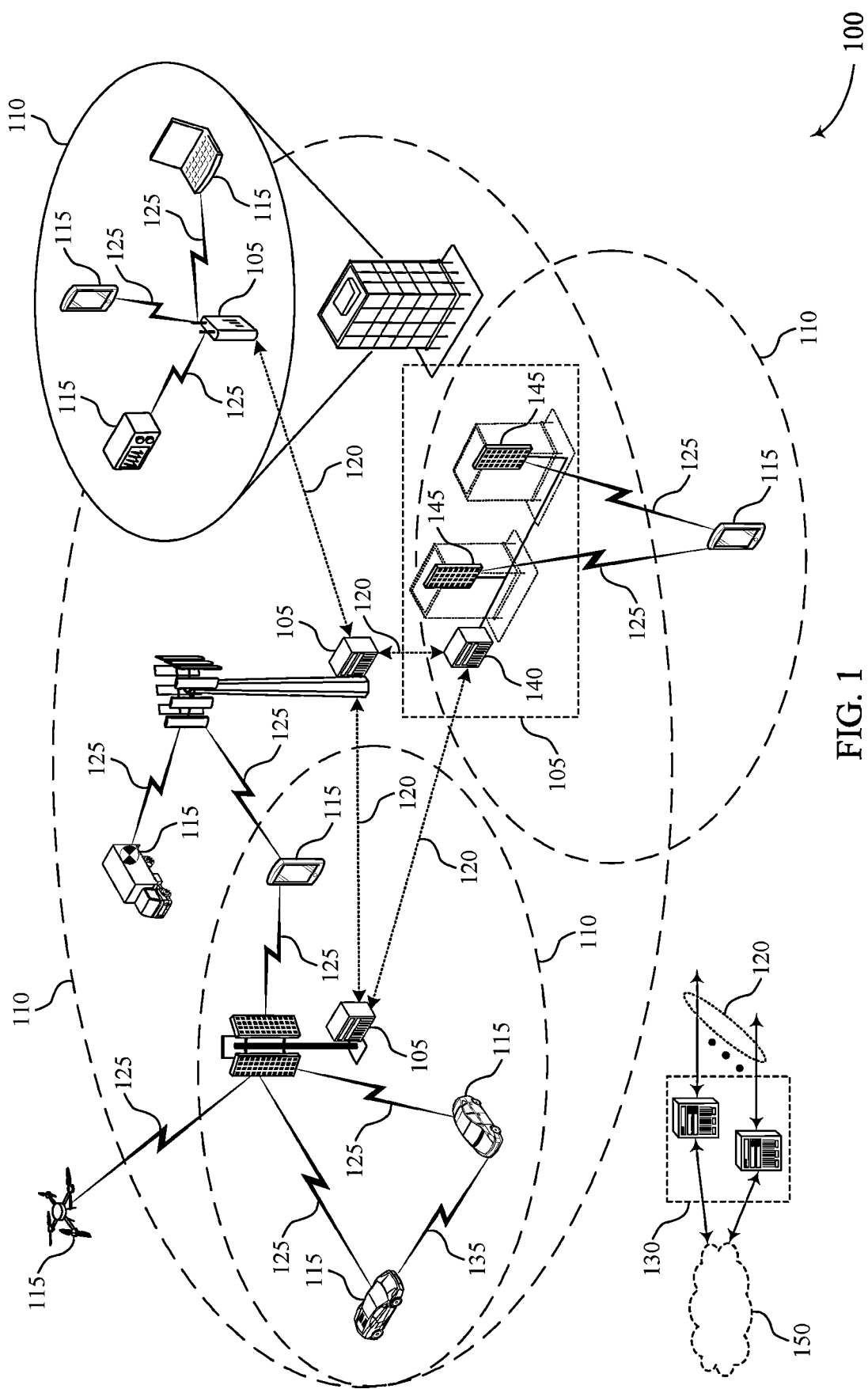
FIG. 1 illustrates an example of a system for wireless communications in accordance with aspects of the present disclosure.

A user equipment (UE) may be capable of directly communicating with other UEs via sidelink communications. For example, the UE may communicate with a second UE via sidelink in a vehicle-to-everything (V2X) system. In some cases, sidelink communications, more specifically V2X communication may become congested. The techniques described herein relate to the introduction of a congestion control service for sidelink (e.g., PC5) communications as previous designs of the V2X Application enabler (VAE) and the Service Enabler Architecture Layer for Verticals (SEAL) framework do not address congestion monitoring or management. Previous design of the VAE and SEAL framework focus on safety services. Such congestion control aspects should be incorporated properly into VAE and SEAL framework to make the system usable in congested areas because as the number of UEs increases, the important times and locations for V2X service use is likely in high congestion areas (e.g., traffic at rush hour, intersections, etc.). Current V2X midlayer (i.e., VAE and SEAL)

framework may not include a service for UE communication status monitoring and congestion detection or a resulting congestion management.

According to the techniques described herein, the VAE and SEAL framework may be enhanced to support the detection of the congestion as well as the management of the congestion. The described techniques relate to the introduction of congestion monitoring and management for both the VAE and SEAL layers (e.g., based on functions associated with the layers as performed by a server, a device, or network node). Due to the nature of sidelink (e.g., PC5) communication, status monitoring and congestion detection may support scenarios when some UEs are not in coverage but communicating with other UEs via PC5. Specifically, the VAE layer understands and should collect information on application running at a specific location, among a specific group, for a particular service (e.g., platooning, sensor sharing, or intersection assistance, etc.), and also collect information regarding UE (e.g., vehicle) velocity and/or directional maneuvers (such as a left turn, right turn, moving in a straight line, a lane change, merging, etc.). The SEAL layer may manage and monitor resources based on PC5 communication status, PC5 communication statistics, number of unicast links, PC5 quality of service (QoS) information, or the like. Based on the collected information, the VAE layer may determine if a service type may be subject to congestion control (and message generation rate is adjusted) according to a determined algorithm. Additionally, based on the collected information, the SEAL layer may also perform analytics to determine if certain type of communication is facing problem or may face an upcoming problem, and provides such information to the VAE layer.

In cases were a UE is out of coverage from a base station, the VAE server may indicate relaying or aggregation of service level status reporting to a UE in coverage to be conveyed to out-of-coverage UEs, such that out-of-coverage UEs may report congestion information to the in-coverage UE according to the indication. The VAE may also configure how congestion control instructions should be distributed through the V2X system (e.g., an in-coverage UE may groupcast the instructions to out-of-coverage UEs). Other considerations for the congestion service at the VAE and SEAL include the use of different Public Land Mobile Networks (PLMNs) by different UEs. In such cases, the VAE or SEAL server may be either common (e.g., placed into the V2X Slice that is shared by multiple PLMNs) or may be placed on the user plane and accessible from different PLMNs. Alternatively, an inter-SEAL server interface can be created, such that an out-of-coverage UE may communicate with its home PLMN (HPLMN) VAE or SEAL server via an in-coverage UE and its SEAL server.

According to the techniques described herein, the VAE may identify a congestion control configuration including capabilities for collecting operation information from sidelink UEs. Then, the VAE may receive, from a plurality of UEs, the operation information in accordance with the capabilities, and the VAE may generate congestion control instructions for one or more UEs of the plurality of UEs based on the received operation information. Additionally, the SEAL may identify a congestion control configuration including capabilities for collecting operation information from sidelink UEs, may monitor sidelink performance for a plurality of UEs in accordance with the capabilities, and may identify a congestion status for a communication type based on monitoring the sidelink performance. Accordingly, the VAE and SEAL framework enhancements may improve congestion mitigation in sidelink communications by using the congestion control service to properly collect communication status information as well as conveying congestion mitigation parameters to a distributed system. It is noted that, while the collection and mitigation of congestion for sidelink communications is described herein with reference to a V2X system, the aspects of the present disclosure may also apply to other systems that support sidelink communications or other systems where various UEs communicate directly with each other.

Aspects of the disclosure are initially described in the context of wireless communications systems. Aspects of the disclosure are further illustrated by and described with reference to apparatus diagrams, system diagrams, and flowcharts that relate to reclaiming resources based on sidelink feedback.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure (V2I), such as roadside units (RSU), or with the network via one or more network nodes (e.g., base stations 105) using vehicle-to-network (V2N) communications, or with both. In some examples, vehicles in the V2X system may communicate with pedestrians or other vulnerable road users, using vehicle-to-pedestrian (V2P) communications.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation, routing, filtering, QoS enforcement, as well as other functions. The user plane entity may be connected to the network operators IP services 150. The operators IP services 150 may include access to the Internet, Intranet(s), an IP Multimedia Subsystem (IMS), or a Packet-Switched Streaming Service. In some examples, the user plane entity may also provide non-IP based services to the UE 115 (e.g. unstructured PDU session type, Ethernet PDU sessions type, or non-IP PDN connections).

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may be a distributed systems where UEs 115 monitor for and receive packets from one or more other UEs 115. For example, while two UEs 115 communicate with each other, a third UE 115 may be capable of monitoring transmissions between the two UEs 115. Additionally, such systems may support the use of midlayers such as the VAE and SEAL to coordinate services and application specific functions between the network and UEs 115 as well as between UEs 115. The VAE and SEAL framework may include a congestion control service for communication on sidelinks between UEs 115. The congestion control service may include VAE and SEAL functions to deal with distributed communication for sidelink communication where not all UEs 115 are in coverage by providing a relaying and aggregation service at SEAL and VAE nodes.

The resources reserved for sidelink communication may be in high demand based on the limited spectrum allocated for V2X and the large amount of UEs 115 that may congregate in a certain area, which is most likely when V2X communication is most desired. For example, V2X communication is useful at peak traffic times in congested locations, when an accident occurs, at a busy intersection, and the like. With the new services enabled by the advanced new radio (NR) V2X over PC5 links, a large amount of traffic (e.g., sensor data or video data) may be transmitted between UEs 115, which may use more sophisticated control in case of congestion based on the application characteristics and requirements, instead of simple rules that applies to all. Thus, techniques to further assist the VAE and SEAL in determining whether congestion is occurring and mitigation options may be desirable.

According to the techniques described herein, a VAE and SEAL enhanced framework may include support for the detection of sidelink congestion as well as the mitigation of the congestion between UEs 115. The described techniques may include the VAE layer collecting information on one or more applications running at a UE 115 at a specific location, among a specific group of UEs 115, for a particular service (e.g., platooning, sensor sharing, or intersection assistance, etc.), and also collect information regarding UE 115 maneuvers, such as a left turn, right turn, going straight, lane change, merge, etc. Further, the SEAL layer may manage and monitor resources based on PC5 communication status, PC5 communication statistics, number of unicast links, PC5 QoS information, or the like. Based on the collected information, the VAE layer may determine if a service type may be subject to congestion control according to a determined algorithm, which may include adjusting the message generation rate at a UE 115. Additionally, based on the collected information, the SEAL layer may also perform analytics to determine if certain type of communication is facing problem or may predict if certain type of communication may face a problem in the future, and provides such information to the VAE layer.

In some cases, status monitoring and congestion detection may support scenarios when some UEs 115 are not in coverage but communicating with other UEs 115 via PC5. In cases were a UE 115 is out of coverage, the VAE may indicate relaying or aggregation of service level status reporting to a UE 115 in coverage, such that out-of-coverage UEs 115 may report congestion information to the in-coverage UE 115. The VAE may also configure how congestion control instructions should be distributed through the V2X system. Other considerations for the congestion service at the VAE and SEAL include the use of different PLMNs by different UEs 115. In such cases, the VAE or SEAL server may be either common or may be placed on the user plane and accessible from different PLMNs. Alternatively, an inter-SEAL server interface can be created, such that an out-of-coverage UE 115 may communicate with its HPLMN VAE or SEAL server via an in-coverage UE 115 and its SEAL server. Accordingly, sidelink congestion may be detected and managed efficiently.

Figure 2:
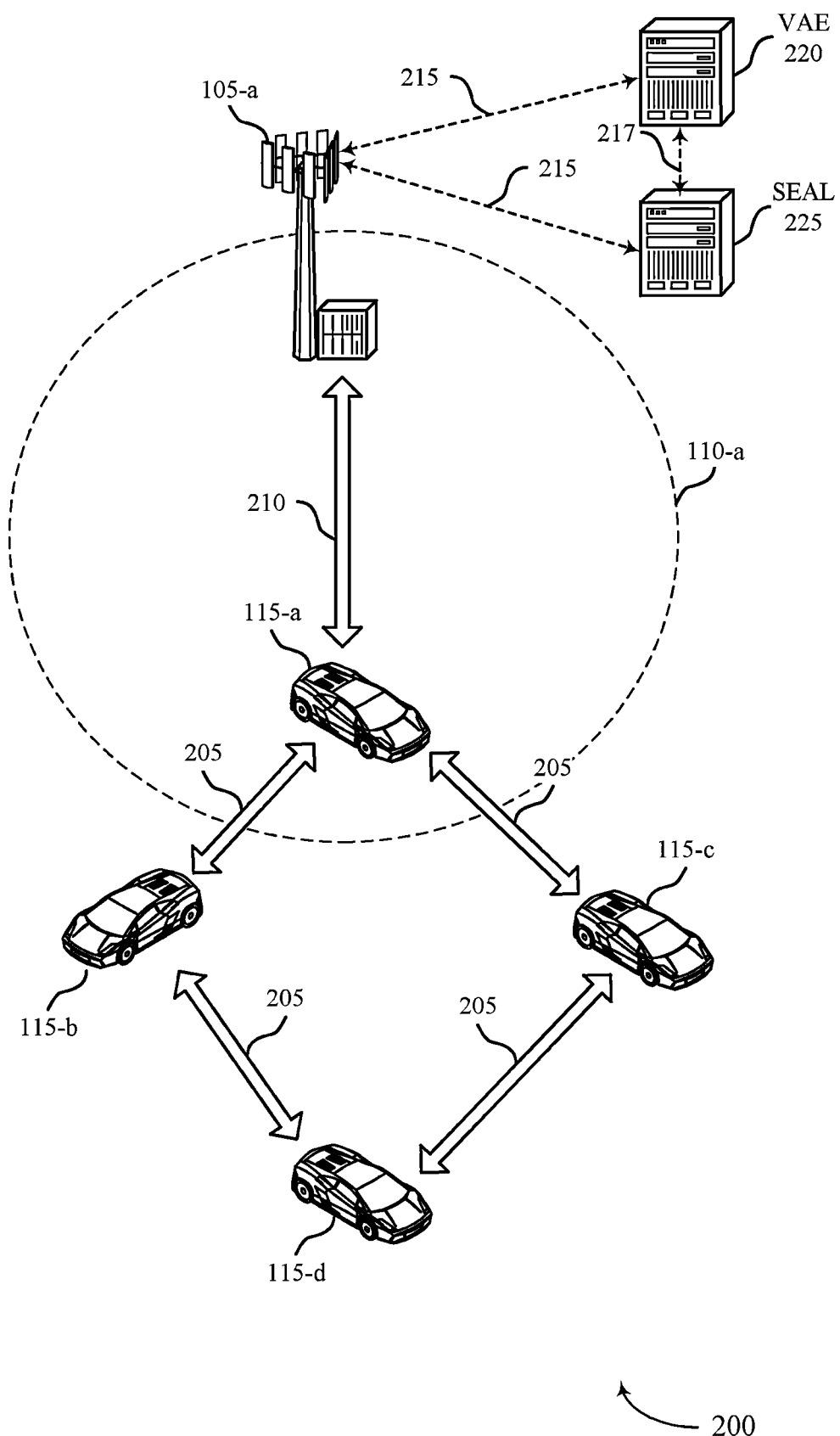
FIG. 2 illustrates an example of a distributed wireless communications system in accordance with aspects of the present disclosure.

FIG. 2 illustrates an example of a distributed wireless communications system 200 in accordance with aspects of the present disclosure. In some examples, distributed wireless communications system 200 may implement aspects of wireless communications system 100. Distributed wireless communications system 200 may be an NR V2X system and may include UEs 115-*a*, 115-*b*, 115-*c*, and 115-*d*, which may be examples of a UE 115, as described with reference to FIG. 1. UEs 115-*a*, 115-*b*, 115-*c*, and 115-*d* may support a congestion control service at the VAE server 220 and SEAL server 225 based on enhanced VAE and SEAL midlayer framework. The techniques described with reference to FIG. 2 may also apply to communications in a system other than a V2X system.

UEs 115 in wireless communications system 200 may be distributed throughout the system and communicate via sidelinks 205. In some examples, UE 115-*a* may be within coverage area 110-*a* of base station 105-*a*. Accordingly, UE 115-*a* and base station 105-*a* may communicate via link 210. UEs 115-*b*, 115-*c*, and 115-*d*, however, may be outside of coverage area 110-*a* of base station 105-*a* and may not be in direct communication with base station 105-*a*. Instead, UEs 115-*b*, 115-*c*, and 115-*d* may indirectly communicate with base station 105-*a* through UE 115-*a* via sidelinks 205. For example, UE 115-*d* may transmit congestion information intended for VAE 220 to UE 115-*b* over sidelink 205. Then, UE 115-*b* may forward the transmissions to UE 115-*a* over a sidelink 205, and UE 115-*a* may forward the transmissions to base station 105-*a* over link 210, where the base station 105-*a* may be in communication with VAE 220 and SEAL 225 via links 215. Additionally, VAE server 220 and SEAL server 225 may be in communication with each other via link 217 and may be configured to support a congestion control service for communication by one or more UEs 115 communicating on sidelinks 205. In some examples, the UE 115-*a*, within the coverage area 110-*a*, may be a roadside unit (RSU) strategically located at a certain position to provide the assistance for other UEs 115.

Sidelink 205 communications, such as V2X communications, may become congested, for example, due to limited spectrum (e.g., 30 MHz), limited radio resources, and large amount of UEs 115 that may congregate in a certain area. In some cases, sidelink 205 congestion may occur when V2X communications are critical for UE 115 behavior (e.g., for safety, such as avoiding situations that may be potentially dangerous of may otherwise impact a user). For example, when UEs 115 are in traffic, near an intersection, approaching an accident, or another UE 115 dense area, communications congestion may occur. Additionally, sidelink 205 congestion may be the result of increasing data transfer rates between UEs 115. For instance, some V2X services enabled by advanced NR V2X over sidelink 205 (e.g., PC5) may transmit a large amount of traffic to enable sensor sharing or raw video data sharing for safety services determinations. Such advanced services may demand sophisticated control when congestion occurs, such as service prioritization based on a location of a UE 115.

As described herein, the VAE 220 and SEAL 225 framework may be enhanced to support the detection of the congestion and the management of the congestion on sidelinks 205. In some cases, all V2X applications may use congestion control, and it is desirable to implement the congestion control at the VAE 220 layer for V2X so that all applications may be handled with consistent manner at each UE 115. As such, congestion control and coordination of sidelink communications may be implemented through functions performed by a server associated with the VAE layer (such as by the VAE server 220). Likewise, congestion control and management may additionally or alternatively be implemented through functions performed by a server associated with the SEAL (such as by the SEAL server 225). The techniques described herein address aspects of V2X sidelink congestion control at both VAE and SEAL layer, including communication status monitoring for congestion detection and congestion management. Due to the nature of sidelink 205 communication, the status monitoring and congestion detection may support PC5 case when not all UEs 115 are in coverage (e.g., UE 115-*a* is in coverage while UEs 115-*b*, 115-*c*, and 115-*d* may be out-of-coverage). The VAE 220 and SEAL 225 may work together to control congestion at sidelinks 205. In some, cases each layer may be responsible for overlapping and/or unique congestion control functions.

The VAE 220 may enable intelligent congestion control by understanding, for each UE 115, which application is running at a specific location, specific UE 115 groupings or zones, particular services (e.g., platooning, sensor sharing, or intersection assistance), and the maneuvers and/or movement of different UEs 115 (e.g., turning left, turning right, moving straight, lane changes, merging, or other like maneuvers). The VAE 220 may also collect operation information for each of these categories. Based on the collected information, the VAE 220 may determine if a service type (e.g., provider service identifier (PSID) or intelligent transport system (ITS) application identifier (AID) (ITS-AID)) may be subject to congestion control, for example, an adjusted message generation rate. This determination may be made according to a determined algorithm. Some example control mechanisms may be based on V2X specific logic, such as service priority logic based on situation awareness or motion state of the UE 115.

The SEAL 225 may enable intelligent congestion control by monitoring and managing sidelink 205 (e.g., PC5) communication status, such as Channel Busy Ratio (CBR) or reference signal receive power (RSRP). Additionally or alternatively, the SEAL 225 may monitor and manage sidelink 205 (e.g., PC5) communication statistics, such as the number of UE 115 groups (e.g., layer two (L2) IDs) or the number of unicast links. Additionally or alternatively, the SEAL 225 may monitor and manage sidelink 205 (e.g., PC5) QoS information including, for example, packet error rate, packet delay observed, HARQ feedback error counts, groupcast range, unicast bitrate, and a prevention quality indicator (PQI). Based on the monitored information, the SEAL 225 may perform analytics to determine if certain type of communication is facing problem and provides such information to VAE 220. In some cases, the determination may be based on data statistics and/or analytics, or some machine learning or artificial intelligence (AI)-based prediction. The SEAL 225 sharing this determination with the VAE 220 allows the VAE 220 to exercise congestion control based on lower layer communication type to adjust an application communication mode.

The VAE 220 and SEAL 225 may collect information from UEs 115. In some cases, information may have to be relayed to the servers. As shown, UE 115-*d* may not have direct communication with UE 115-*a*, which is in coverage, and therefore, UE 115-*a* cannot directly monitor and report the information from UE 115-*d* to the VAE 220 and SEAL 225 (which may be referred to as a SEAL network resource management (NRM) server). In order to support this common case of out-of-coverage UEs 115 for V2X, UE 115-*b* or 115-*c* may help in providing the information from UE 115-*d* to the network side (e.g., VAE 220 or SEAL 225) via UE 115-*a*.

In some examples, UE 115-*a* may serve as a UE-to-network relay for the out of coverage UEs 115 (e.g., UEs 115-*b*, 115-*c*, and 115-*d*), and each UE 115-*a*, 115-*b*, 115-*c*, and 115-*d* reports to the server individually. Accordingly, repeated information may be sent to the VAE 220 and SEAL

225. The UE 115-*a* may provide the relay or proxy operation to the VAE 220 and SEAL 225, and the VAE 220 and SEAL 225 may organize and aggregate the information.

In other examples, each of the UEs 115 may forward the report information with associated location information. For instance, UE 115-*d* may forward the report information to another UE 115 (e.g., UE 115-*b* or UE 115-*c*), and the receiving UE 115 may aggregate and trim overlapping information between received information and its own information before groupcasting the report information to another UE 115 (e.g., UE 115-*a*). UE 115-*a* may be in coverage area 110-*a* and may not further groupcast the information. Instead, UE 115-*a* may trim the overlapping information and directly report the aggregated information to VAE 220 and SEAL 225 (e.g., via base station 105-*a*).

To limit the unnecessary propagation of information, UE 115-*b* or 115-*c* may limit re-groupcast information to information within limited UE 115 zones (e.g., geographic areas, locations, or the like), which may be pre-configured, signaled to UEs 115-*b* or 115-*c* while in network coverage, or relayed to UEs 115-*b* or 115-*c* by UE 115-*a* that is in coverage. The VAE 220 and SEAL 225 may configure the UEs 115 in a particular region to increase the zones if the VAE 220 or SEAL 225 determines one or more holes in the collected information. For example, VAE 220 may request more information from UE 115-*b* via UE 115-*a* based on a lack of complete congestion information.

Similar to information collection, VAE 220 and SEAL 225 may distribute congestion controls to UEs 115. In some examples, the layers may work together for cross-layer congestion management. As described above, VAE 220 and SEAL 225 may exercise congestion control management at different levels. For example, VAE 220 may determine that a certain service (e.g., a safety service) should be prioritized and therefore request that to the SEAL 225. An NRM server may generate the corresponding policies to be delivered to all the UEs 115 in a particular region. For example, this may be achieved by an NRM Server request via 5G system exposure function (e.g., network exposure function (NEF) and Unified Data Repository (UDR) and policy control function (UDR-PCF)) to deliver the configurations to UEs 115 directly via the UE 115 policy provisioning mechanism, or delivered to the NG-RAN to be broadcasted out via SIB or dedicated RRC signaling, etc.

In some cases, the VAE 220 may have direct control at the V2X layer such as setting the message generation rate for some services. Such configuration may be provided via the above NEF-UDR-PCF-AMF route to UE 115 as part of the application server configuration via control plane, or it may be provisioned via user plane directly to the UE 115. Since not all of the UEs 115 are in the coverage (e.g., UEs 115-*b*, 115-*c*, and 115-*d* are out-of-coverage), some UEs 115 should forwards the received configuration via sidelink 205 (e.g., PC5) to other UEs 115 in the target region as indicated by the servers. For example, UE 115-*a* may forward the configuration to UEs 115-*b* and 115-*c*, and UE 115-*b* or 115-*c* may forward the configuration to UE 115-*d*. In some cases, the VAE 220 and SEAL 225 may identify the UE 115 (e.g., UE 115-*a*) that is in the target region and deliver the updated congestion control management instructions to UE 115-*a*. UE 115-*a* may use an explicit indication from the VAE 220 or SEAL 225 or the target region of the information element (IE) to determine whether and how to forward the configuration (e.g., groupcast with Range control).

In some cases, not all UEs 115 are subscribed to the same PLMN. For example, UEs 115-*a* and 115-*b* may be subscribed to a first PLMN while UEs 115-*c* and 115-*d* may be subscribed to a second, different PLMN. For the V2X case, different UEs 115 may have different HPLMNs. To support such operation, the VAE 220 or SEAL 225 may be either common such that it is shared by multiple PLMNs, for example placed into the V2X Slice. In another example, the VAE 220 or SEAL 225 may be placed on the user plane and accessible from different PLMNs. Alternatively, an inter-SEAL server interface may be created, such that UE 115-*c* may send to its HPLMN VAE 220 or SEAL 225 server via UE 115-*a* and its SEAL 225 by indicating its HPLMN ID in the report message. This inter-SEAL interface may then be handled as roaming for SEAL only and there may be no need for a general national roaming agreement.

Figure 3:
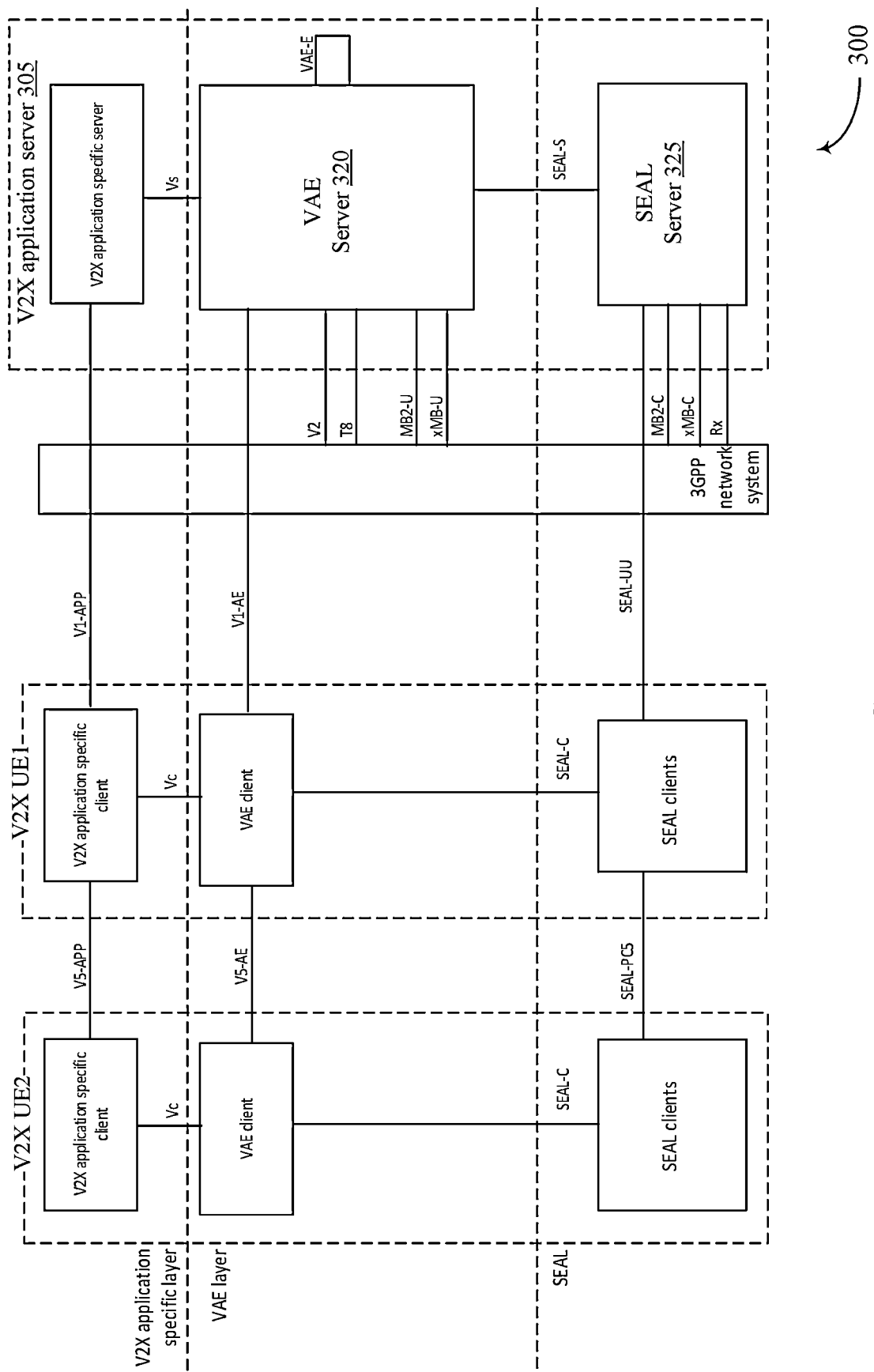
FIG. 3 illustrates an example of a midlayer framework in accordance with aspects of the present disclosure.

FIG. 3 illustrates an example of a midlayer framework 300 in accordance with aspects of the present disclosure. In some examples, midlayer framework 300 may implement aspects of wireless communications systems 100 and 200. Midlayer framework 300 may include V2X application server 305, which may include VAE server 320 and SEAL servers 325, as well as V2X UE1 and V2X UE2, which may be examples of UEs 115 in FIG. 2.

The VAE and SEAL framework may be defined on the user plane. For example, The VAE layer may provide the corresponding user plane data and/or control towards the 3GPP network system and service requirements to the SEAL layer. In some examples, the SEAL layer may interact with the 3GPP network system to fulfill the V2X service requirements. With these, some of the V2X Application specific functions may be offloaded to the VAE and SEAL layers.

According to techniques described herein, the VAE framework may include a congestion control service at VAE server 320 for detecting and managing congestion between V2X UE1 and V2X UE2, which may be UEs 115 as described in FIG. 2. Additionally or alternatively, the VAE framework may include a potential relaying or aggregation of service level status reporting at V2X UE1 and V2X UE2, which may be UEs 115 as described in FIG. 2, as well as including congestion control instruction distribution at VAE server 320 and relaying service at V2X UE1 and V2X UE2.

According to techniques described herein, the SEAL framework may include a congestion control monitoring and management service at SEAL servers 325 and V2X UE1 and V2X UE2. The SEAL framework may also include a relaying of reporting and instruction distribution service for the VAE layer. In some examples, the SEAL framework may include the additional cross layer interaction with the VAE for congestion control management at the SEAL servers 325. Additionally or alternatively, the SEAL framework may include analytic and prediction functions for the PC5 operation at the SEAL servers 325.

Figure 4:
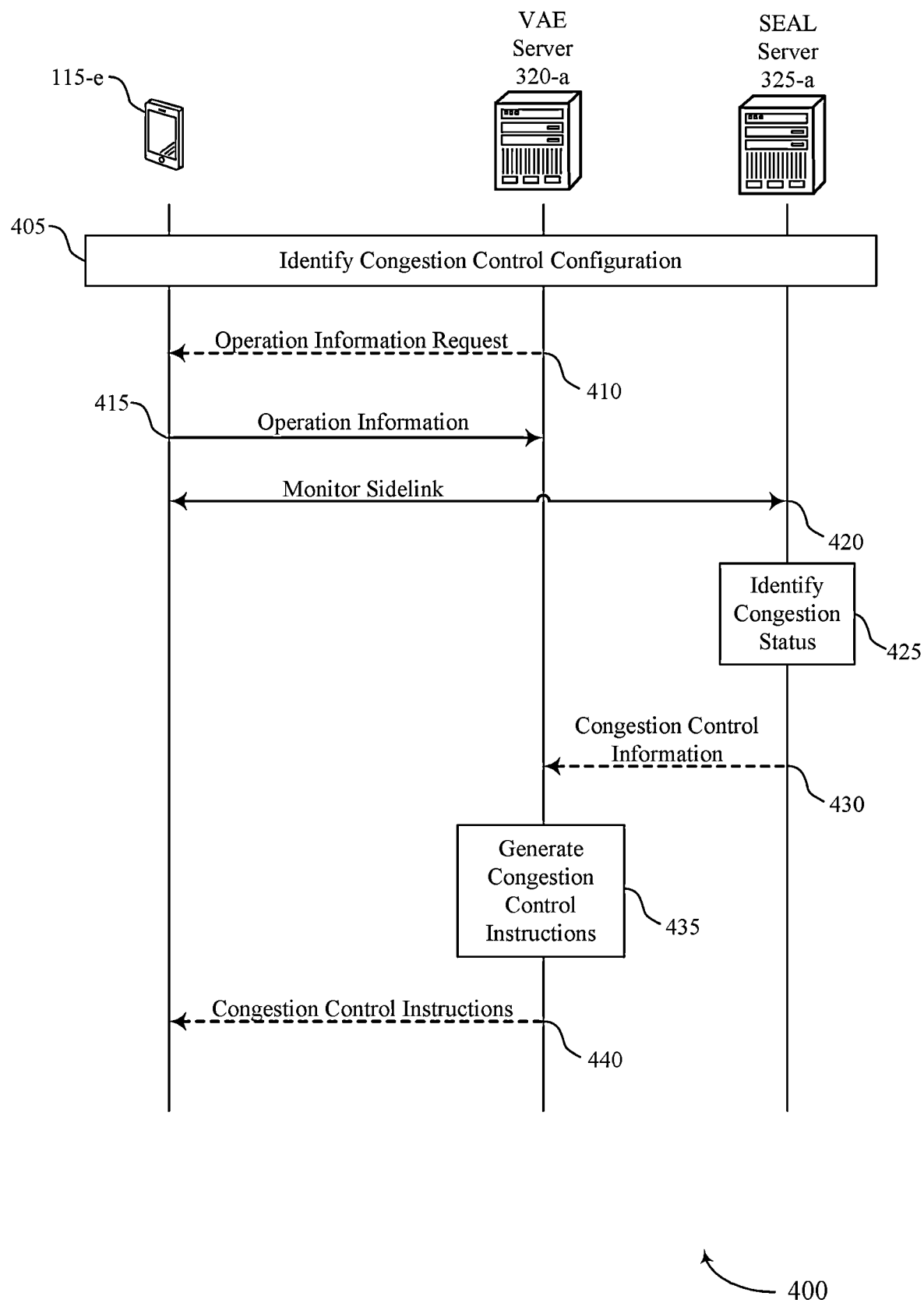
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of wireless communications systems 100 and 200. Process flow 400 is shown as being implemented by an in coverage UE 115-*e*, which may be a part of a V2X system and may be examples of the UEs as described with respect to FIGS. 1 and 2. For example, UE 115-*e* may be an example of UE 115-*a* of FIG. 2. Process flow 400 is also shown as being implemented by VAE server 320-*a* and SEAL server 325-*a*, which may be a part of a V2X system and may be examples of the VAE and SEAL servers as described with respect to FIGS. 2 and 3.

In the following description of the process flow 400, the operations of UE 115-*e*, VAE server 320-*a*, and SEAL server 325-*a* may occur in a different order than the exemplary order shown. Certain illustrated operations may also be left out of the process flow 400, or other operations may be added to the process flow 400. It is to be understood that while UE 115-e, VAE server 320-a, and SEAL server 325-a are shown performing a number of the operations of process flow 400, any wireless device may perform the operations shown.

At 405, the UE 115-e, VAE server 320-a, and SEAL server 325-a may identify a congestion control configuration. In some cases, the congestion control configuration may include capabilities for collecting operation information at the VAE server 320-a and SEAL server 325-a.

At 410, the VAE server 320-a may transmit and the UE 115-e may receive an operation information request. In some examples, the request may be based on an identified hole in the information by VAE server 320-a or SEAL server 325-a.

At 415, the UE 115-e may transmit and the VAE server 320-a may receive the operation information in accordance with the capabilities and optionally the request at 410. In some examples, the operation information includes location specific application information, sidelink group specific information, vehicle-to-everything service specific information, UE movement information, or a combination thereof.

At 420, the SEAL server 325-a may monitor the sidelink performance of UE 115-e in accordance with the capabilities. In some examples, the sidelink performance include sidelink communication status, sidelink communication statistics, sidelink quality of service information, or a combination thereof.

At 425, the SEAL server 325-a may identify a congestion status for a communication type based on monitoring the sidelink performance at 420. In some cases, identifying the congestion status of the communication type may include identifying potential congestion of the communication type based on a prediction based on monitoring the sidelink performance.

At 430, the SEAL server 325-a may transmit and the VAE server 320-a may receive congestion control information for one or more UEs 115 based on identifying the congestion status at 425. In some examples, the congestion control information comprises a lower layer communication type.

At 435, the VAE server 320-a may generate congestion control instructions for one or more UEs 115 based on the received operation information and optionally the received congestion control information at 430.

At 440, the VAE server 320-a may transmit and UE 115-e may receive, and then forward to other UEs 115, the congestion control instructions based on the instruction generation at 435. In some examples, the instructions may include a distribution configuration. In some cases, transmitting the congestion control instructions may include transmitting the instruction distribution configuration via a user plane, a control plane, system information, radio resource control signaling, or a combination thereof. In some cases, the congestion control instructions include a prioritization of lower layer communication types. In some examples, the congestion control instructions include a message generation rate adjustment, an application communication mode adjustment, a prioritization of lower layer communication types, or a combination thereof.

Figure 5:
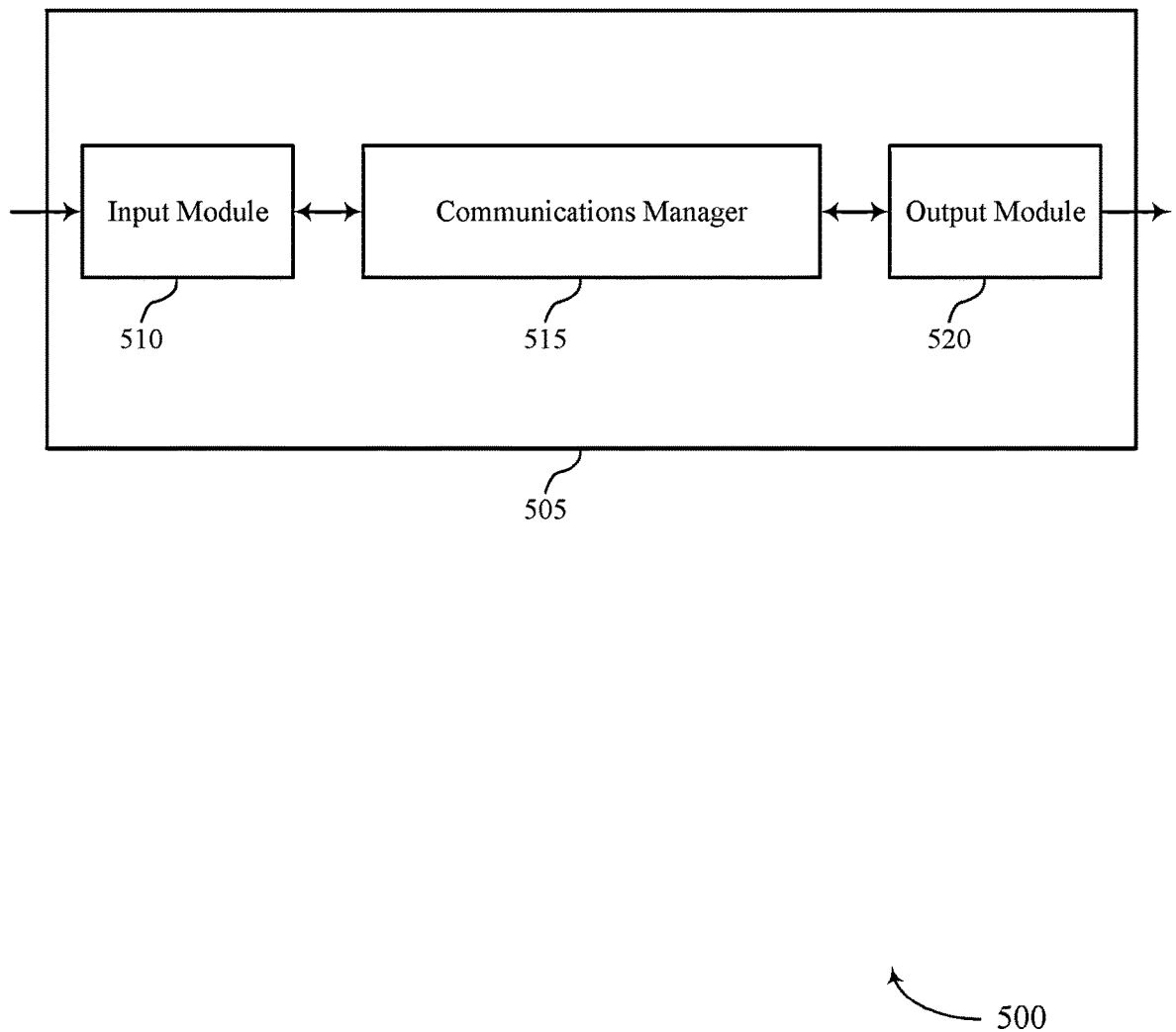
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of an application server as described herein. For instance, the application server may be an example of a VAE server, a SEAL server, an NRM server, or the like. The device 505 may include an input module 510, a communications manager 515, and an output module 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the communications manager 515 to support congestion control for a sidelink midlayer framework. In some cases, the input module 510 may be a component of an input/output (I/O) controller 815 as described with reference to FIG. 8.

The communications manager 515 may identify, at an application enabler layer, a congestion control configuration including capabilities for collecting operation information, receive, from a set of UEs, the operation information in accordance with the capabilities, and generate congestion control instructions for one or more UEs of the set of UEs based on the received operation information. In some examples, operations performed at the application enabler layer are performed by executing instructions associated with that layer; for example, at an application server. The communications manager 515 may also identify, at an application enabler architecture layer, a congestion control configuration including capabilities for collecting operation information, monitor sidelink performance for a set of UEs in accordance with the capabilities, and identify a congestion status for a communication type based on monitoring the sidelink performance. In some examples, operations performed at the application enabler architecture layer are performed by executing instructions associated with that layer; for example, at an application server. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The output module 520 may manage output signals for the device 505. For example, the output module 520 may receive signals from other components of the device 505, such as the communications manager 515, and may transmit these signals to other components or devices. In some specific examples, the output module 520 may transmit output signals for display in a user interface, for storage in a database or data store, for further processing at a server or server cluster, or for any other processes at any number of devices or systems. In some cases, the output module 520 may be a component of an I/O controller 815 as described with reference to FIG. 8.

Figure 6:
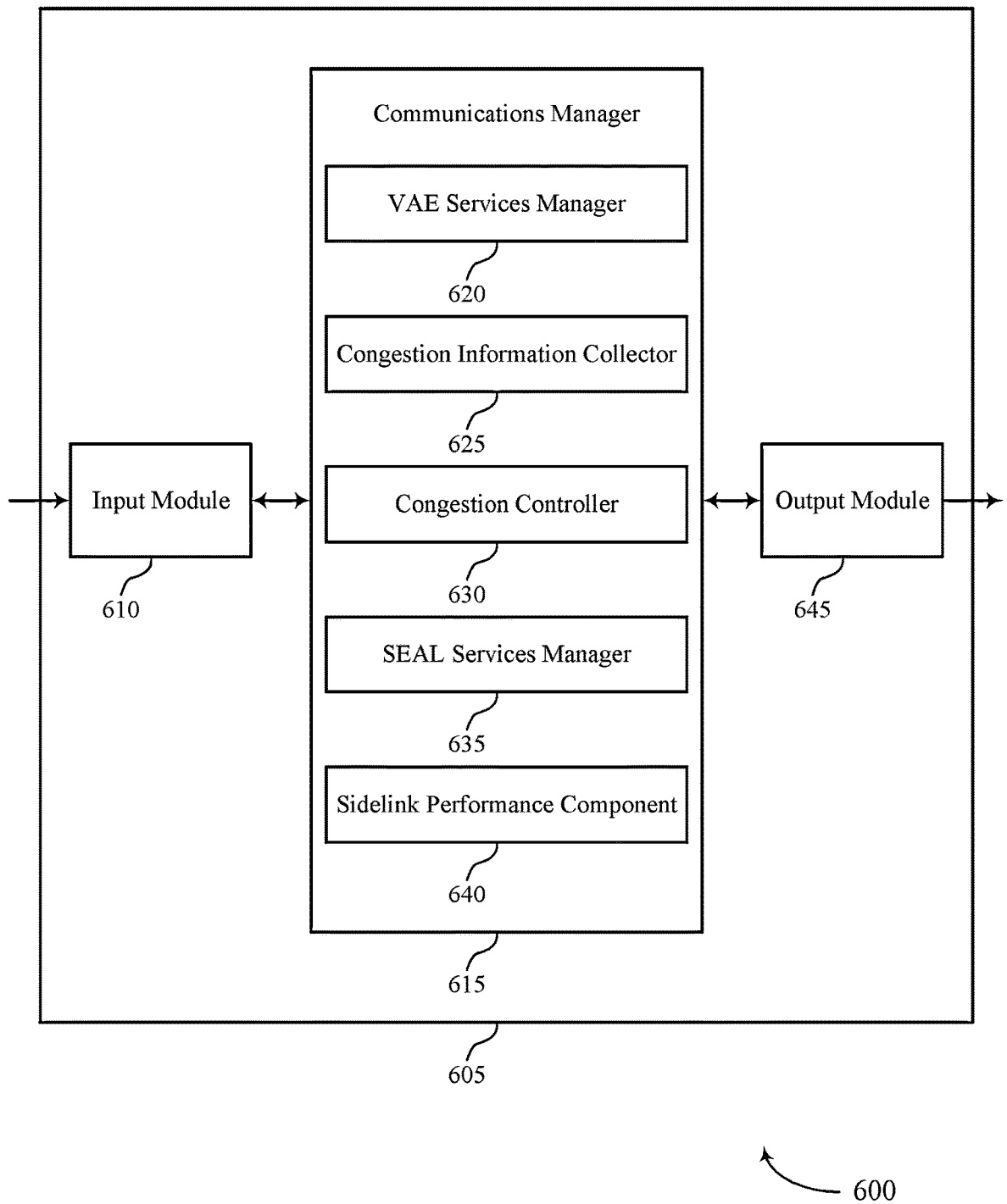

FIG. 6 shows a block diagram 600 of an apparatus 605 in accordance with aspects of the present disclosure. The device 605 may be an example of aspects of a device 505 or an application server as described herein (e.g., an application server 305, or a VAE server 320, or a SEAL server 325, or a combination thereof, as described with reference to FIG. 3). For example, the apparatus 605 may be an example of, or perform aspects of the functions of, a VAE server, a SEAL server, an NRM server, or the like. The apparatus 605 may include an input module 610, a communications manager 615, and an output module 645. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the communications manager 615 to support congestion control by a sidelink midlayer framework. In some cases, the input module 610 may be a component of an input/output (I/O) controller 815 as described with reference to FIG. 8.

The communications manager 615 may be an example of aspects of the communications manager 515 as described herein. The communications manager 615 may include a VAE services manager 620, a congestion information collector 625, a congestion controller 630, a SEAL services manager 635, and a sidelink performance component 640. The communications manager 615 may be an example of aspects of the communications manager 705 or 810 described with reference to FIGS. 7 and 8.

The communications manager 615 and/or at least some of its various sub-components may be implemented in hardware, software executed by a processor, firmware, or any combination thereof. If implemented in software executed by a processor, the functions of the communications manager 615 and/or at least some of its various sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615 and/or at least some of its various sub-components may be physically located at various positions, including being distributed such that portions of functions are implemented at different physical locations by one or more physical devices. In some examples, the communications manager 615 and/or at least some of its various sub-components may be a separate and distinct component in accordance with various aspects of the present disclosure. In other examples, the communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The VAE services manager 620 may identify, at an application enabler layer, a congestion control configuration including capabilities for collecting operation information. In some examples, operations performed at the application enabler layer are performed by executing instructions associated with that layer; for example, at an application server. The congestion information collector 625 may receive, from a set of UEs, the operation information in accordance with the capabilities. The congestion controller 630 may generate congestion control instructions for one or more UEs of the set of UEs based on the received operation information. The congestion controller 630 may identify a congestion status for a communication type based on monitoring the sidelink performance.

The SEAL services manager 635 may identify, at an application enabler architecture layer, a congestion control configuration including capabilities for collecting operation information. In some examples, operations performed at the application enabler architecture layer are performed by executing instructions associated with that layer; for example, at an application server. The sidelink performance component 640 may monitor sidelink performance for a set of UEs in accordance with the capabilities.

The output module 645 may manage output signals for the apparatus 605. For example, the output module 645 may receive signals from other components of the apparatus 605, such as the communications manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
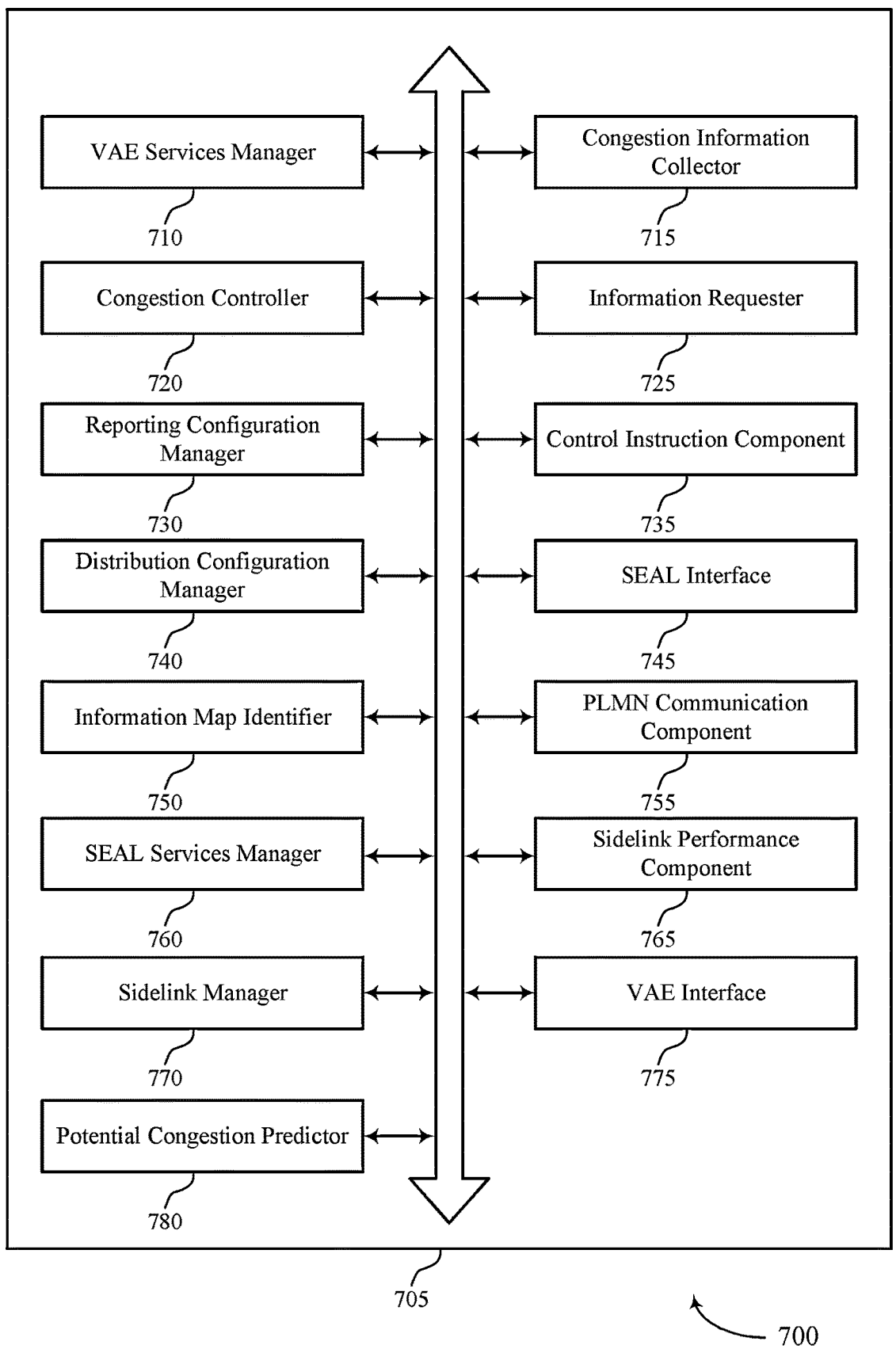
FIG. 7 shows a block diagram of a communications manager in accordance with aspects of the present disclosure.

FIG. 7 shows a block diagram 700 of a communications manager 705 in accordance with aspects of the present disclosure. The communications manager 705 may be an example of aspects of a communications manager 515, a communications manager 615, or a communications manager 810 described herein. The communications manager 705 may include a VAE services manager 710, a congestion information collector 715, a congestion controller 720, an information requester 725, a reporting configuration manager 730, a control instruction component 735, a distribution configuration manager 740, a SEAL interface 745, an information map identifier 750, a PLMN communication component 755, a SEAL services manager 760, a sidelink performance component 765, a sidelink manager 770, a VAE interface 775, and a potential congestion predictor 780. Each of these modules may communicate, directly or indirectly, with one another (e.g., via one or more buses).

The VAE services manager 710 may identify, at an application enabler layer, a congestion control configuration including capabilities for collecting operation information. In some examples, operations performed at the application enabler layer are performed by executing instructions associated with that layer; for example, at an application server. In some cases, the operation information includes location specific application information, sidelink group specific information, vehicle-to-everything service specific information, UE movement information, or a combination thereof. In some cases, the application enabler layer includes a vehicle-to-everything application enabler layer.

The congestion information collector 715 may receive, from a set of UEs, the operation information in accordance with the capabilities. In some examples, the congestion information collector 715 may receive, from the set of UEs, the operation information based on the operation information request. In some examples, the congestion information collector 715 may receive, from a UE of the set of UEs, one or more sidelink status reports, where the UE relays the one or more sidelink status reports from one or more out of coverage UEs of the set of UEs. In some cases, the one or more sidelink status reports includes aggregated status reports from each UE of the set of UEs.

The congestion controller 720 may generate congestion control instructions for one or more UEs of the set of UEs based on the received operation information. In some examples, the congestion controller 720 may identify a congestion status for a communication type based on monitoring the sidelink performance. In some examples, the congestion controller 720 may detect congestion for a service type based on the received operation information, where the congestion control instructions for the one or more UEs of the set of UEs are associated with the service type and based on the detected congestion.

The information requester 725 may transmit, to a subset of the set of UEs within network coverage, an operation information request. In some examples, the information requester 725 may transmit, to a subset of the set of UEs within network coverage, an operation information trigger with relay instructions based on the operation information map. In some examples, the information requester 725 may transmit, to a subset of the set of UEs within network coverage, a performance information request with relay instructions based on the status information map.

The reporting configuration manager 730 may transmit, to the subset of the set of UEs, a reporting configuration for reporting the operation information, where the reporting configuration includes relay instructions based on a coverage level of each of the set of UEs. In some cases, the reporting configuration includes aggregation instructions associated with the relay instructions.

The control instruction component 735 may transmit the congestion control instructions to a UE of the set of UEs, the UE being within network coverage. In some examples, the control instruction component 735 may receive, from the application enabler layer, congestion control instructions for the one or more UEs of the set of UEs based on transmitting the congestion control information. In some cases, the congestion control instructions include a message generation rate adjustment, an application communication mode adjustment, a prioritization of lower layer communication types, or a combination thereof. In some cases, the congestion control instructions includes a prioritization of lower layer communication types. In some cases, the congestion control information includes a lower layer communication type.

The distribution configuration manager 740 may transmit, to the UE, an instruction distribution configuration for relaying the congestion control instructions. In some examples, the distribution configuration manager 740 may transmit, to the UE, an instruction distribution configuration via a user plane, a control plane, system information, radio resource control signaling, or a combination thereof.

The SEAL interface 745 may receive, from an application enabler architecture layer, congestion control information for the one or more UEs of the set of UEs, where generating the congestion control instructions for the one or more UEs of the set of UEs is based on the received congestion control information. In some examples, operations performed at the application enabler architecture layer may be performed by executing instructions associated with that layer, for instance, at an application server. As an example, identifying the congestion control configuration comprising capabilities for collecting operation information in the application enabler architecture layer may include executing instructions associated with the application enabler architecture layer at an application server to identify the congestion control configuration. Likewise, the various aspects of functions performed at the application enabler architecture layer and the application enabler layer may be performed by a server executing corresponding instructions. In some cases, the application enabler architecture layer includes a service enabler architecture layer for verticals including an inter-server interface.

The information map identifier 750 may identify an operation information map based on the received congestion control information. In some examples, the information map identifier 750 may identify a status information map based on monitoring the sidelink performance.

The PLMN communication component 755 may manage the application enabler layer, which includes a vehicle-to-everything application enabler layer in communication with a common vehicle-to-everything server shared by a set of public land mobile networks or a vehicle-to-everything server on a user plane accessible from each of the set of public land mobile networks. In some cases, the application enabler layer includes a vehicle-to-everything application enabler layer in communication with a common vehicle-to-everything server shared by a set of public land mobile networks or a vehicle-to-everything server on a user plane accessible from each of the set of public land mobile networks.

The SEAL services manager 760 may identify, at an application enabler architecture layer, a congestion control configuration including capabilities for collecting operation information.

The sidelink performance component 765 may monitor sidelink performance for a set of UEs in accordance with the capabilities. In some cases, the sidelink performance includes sidelink communication status, sidelink communication statistics, sidelink quality of service information, or a combination thereof.

The sidelink manager 770 may manage sidelink operations for the communication type based on identifying the congestion status.

The VAE interface 775 may transmit, to an application enabler layer, congestion control information for one or more UEs of the set of UEs based on identifying the congestion status. In some examples, the VAE interface 775 may transmit, to an application enabler layer, congestion control information for one or more UEs of the set of UEs based on identifying the potential congestion status.

The potential congestion predictor 780 may identify potential congestion of the communication type based on a prediction based on monitoring the sidelink performance.

Figure 8:
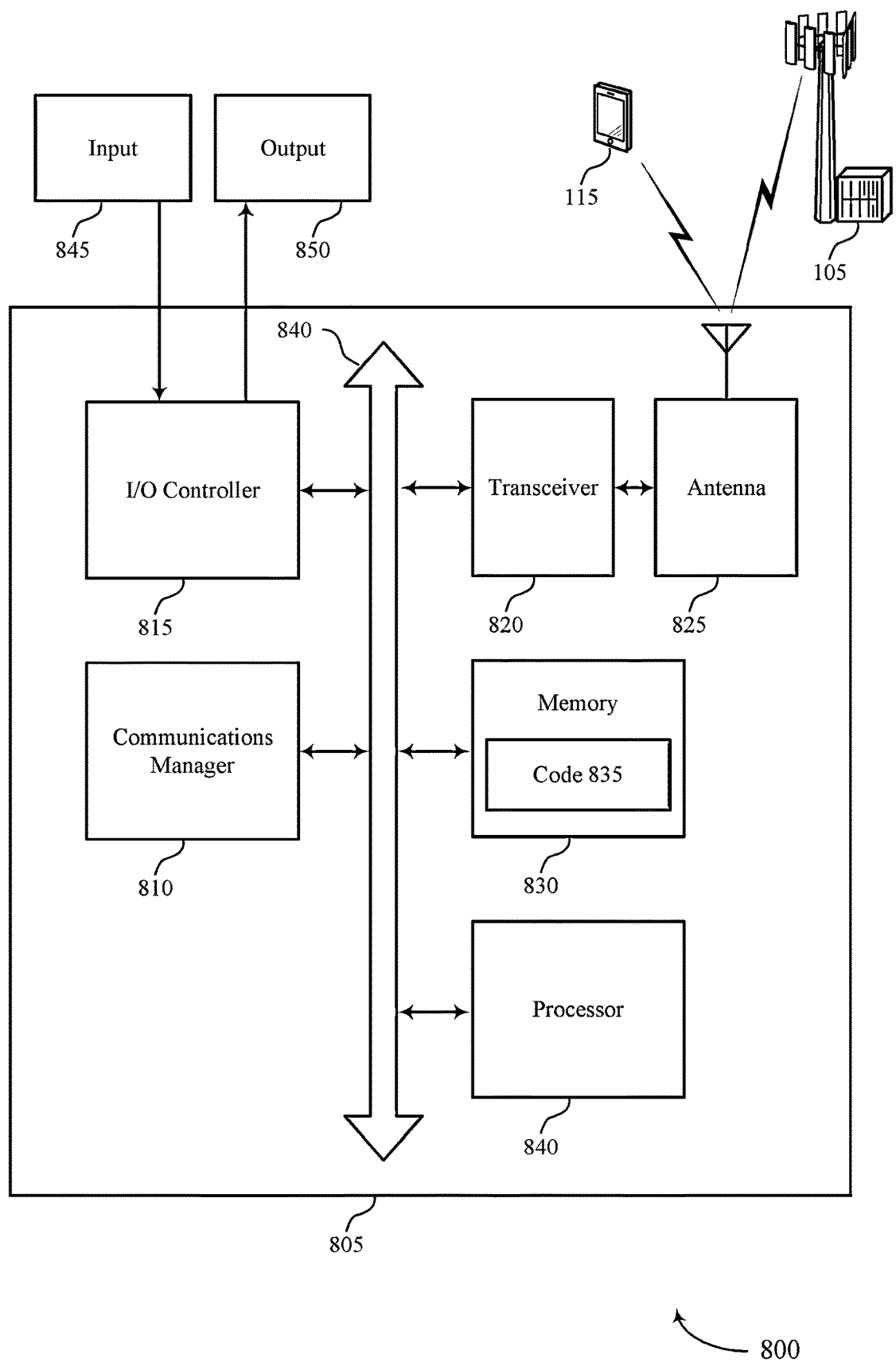
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of an application server or an device 505, device 605, or an application server as described herein (e.g., VAE or SEAL). The device 805 may include components for bi-directional data communications including components for transmitting and receiving communications, including a communications manager 810, an I/O controller 815, a transceiver 820, an antenna 825, memory 830, a processor 840, input 845, and output 850. These components may be in electronic communication via one or more buses (e.g., bus 845).

The communications manager 810 may be an example of a communications manager 615 or 705 as described herein. For example, the communications manager 810 may perform any of the methods or processes described above with reference to FIGS. 6 and 7. In some cases, the communications manager 810 may be implemented in hardware, software executed by a processor, firmware, or any combination thereof.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reclaiming resources based on sidelink feedback).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
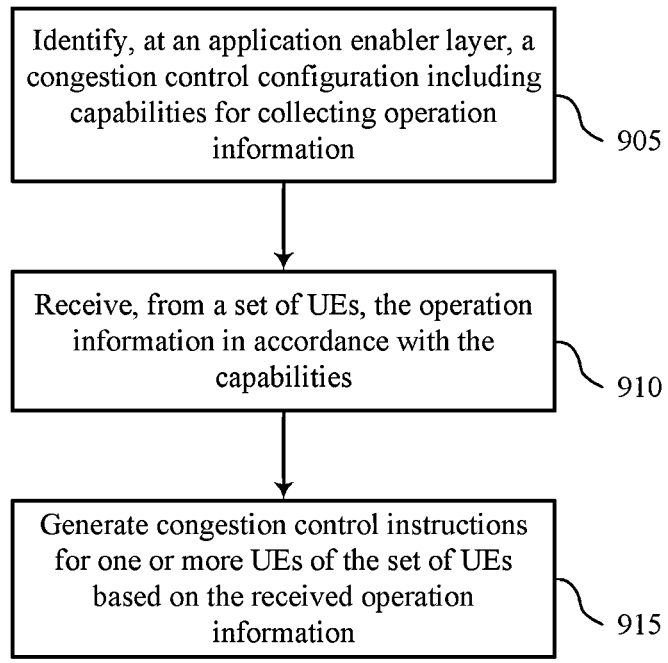
FIGS. 9 through 14 show flowcharts illustrating methods in accordance with aspects of the present disclosure.

FIG. 9 shows a flowchart illustrating a method 900 in accordance with aspects of the present disclosure. The operations of method 900 may be implemented by an application server or its components as described herein. For example, the operations of method 900 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 905, the application server may identify, at an application enabler layer (e.g., by executing instructions associated with the application enabler layer), a congestion control configuration including capabilities for collecting operation information. The operations of 905 may be performed according to the methods described herein. In some examples, aspects of the operations of 905 may be performed by a VAE services manager as described with reference to FIGS. 5 through 8.

At 910, the application server may receive, from a set of UEs, the operation information in accordance with the capabilities. The operations of 910 may be performed according to the methods described herein. In some examples, aspects of the operations of 910 may be performed by a congestion information collector as described with reference to FIGS. 5 through 8.

At 915, the application server may generate congestion control instructions for one or more UEs of the set of UEs based on the received operation information. The operations of 915 may be performed according to the methods described herein. In some examples, aspects of the operations of 915 may be performed by a congestion controller as described with reference to FIGS. 5 through 8.

Figure 10:
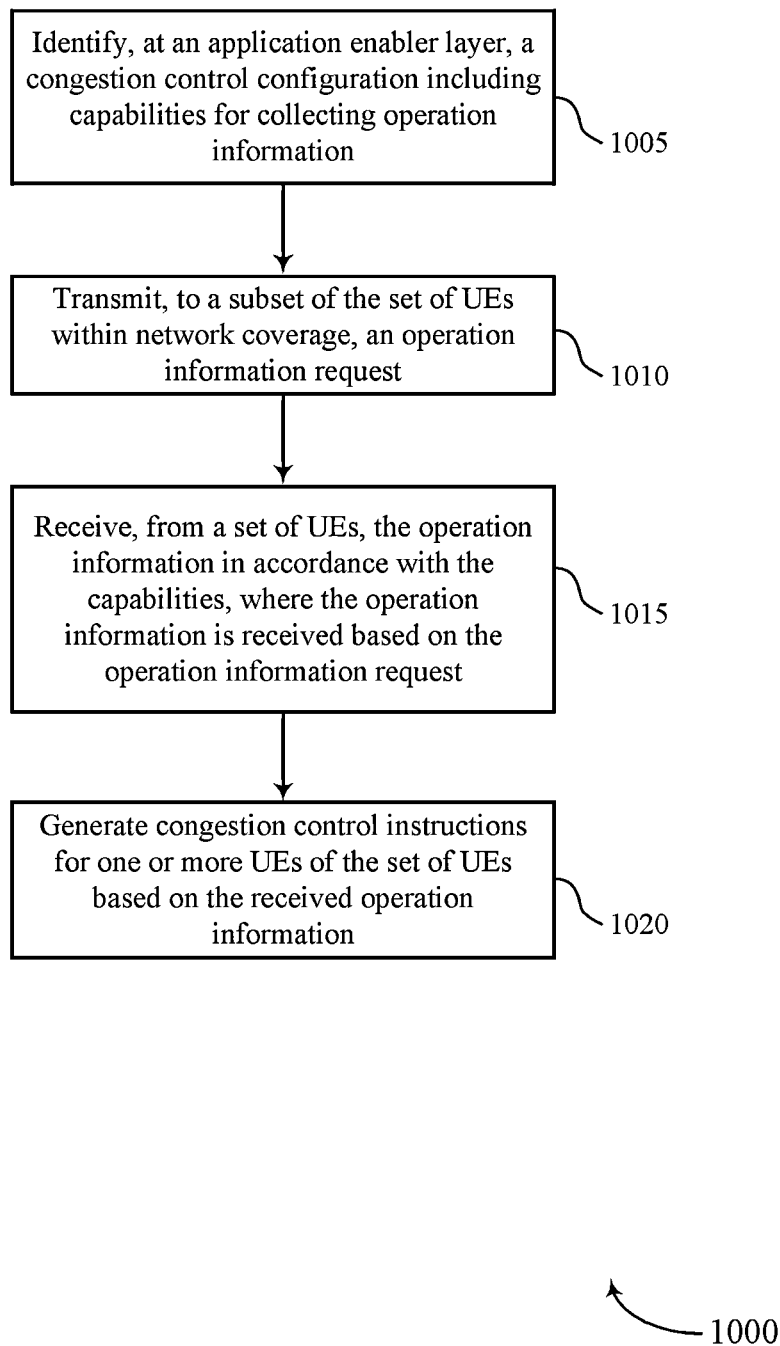

FIG. 10 shows a flowchart illustrating a method 1000 in accordance with aspects of the present disclosure. The operations of method 1000 may be implemented by an application server or its components as described herein. For example, the operations of method 1000 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 1005, the application server may identify, at an application enabler layer, a congestion control configuration including capabilities for collecting operation information.

The operations of 1005 may be performed according to the methods described herein. In some examples, aspects of the operations of 1005 may be performed by a VAE services manager as described with reference to FIGS. 5 through 8.

At 1010, the application server may transmit, to a subset of the set of UEs within network coverage, an operation information request. The operations of 1010 may be performed according to the methods described herein. In some examples, aspects of the operations of 1010 may be performed by an information requester as described with reference to FIGS. 5 through 8.

At 1015, the application server may receive, from a set of UEs, the operation information in accordance with the capabilities, where the operation information may be received based on the operation information request. The operations of 1015 may be performed according to the methods described herein. In some examples, aspects of the operations of 1015 may be performed by a congestion information collector as described with reference to FIGS. 5 through 8.

At 1020, the application server may generate congestion control instructions for one or more UEs of the set of UEs based on the received operation information. The operations of 1020 may be performed according to the methods described herein. In some examples, aspects of the operations of 1020 may be performed by a congestion controller as described with reference to FIGS. 5 through 8.

Figure 11:
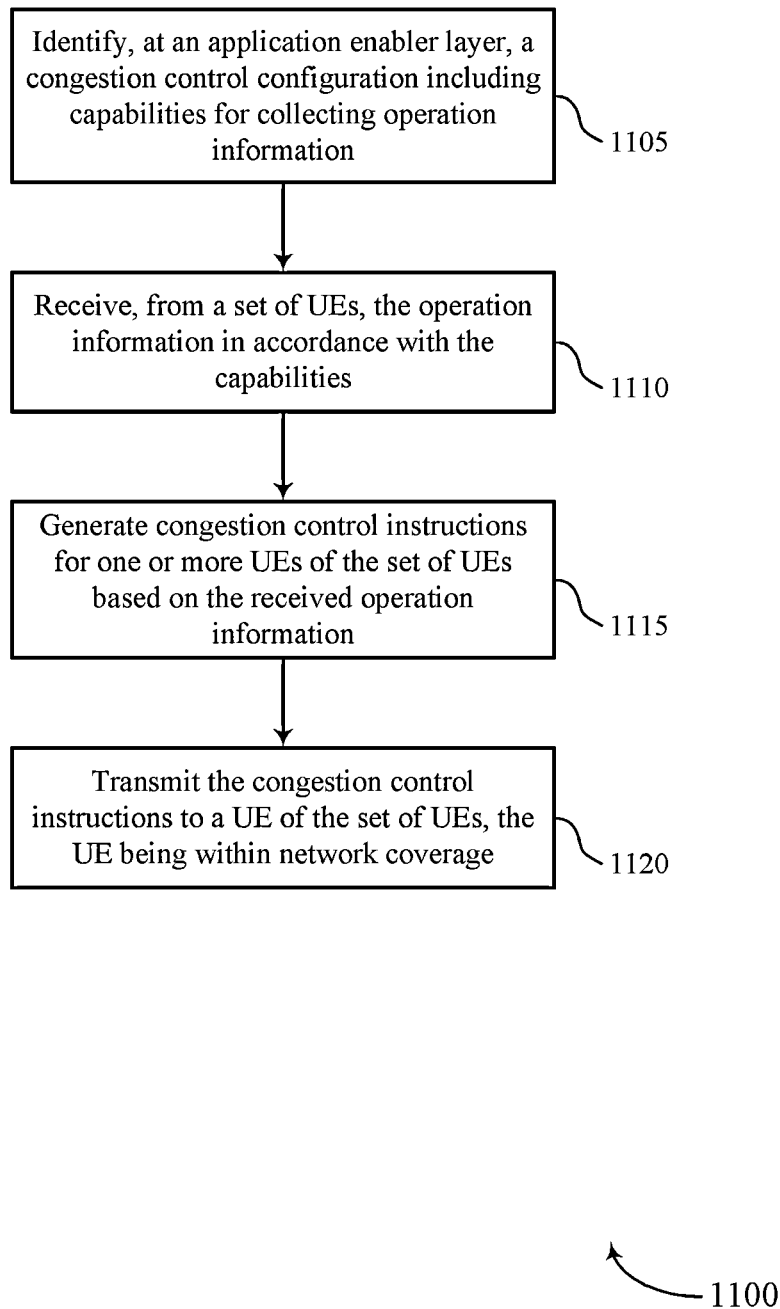

FIG. 11 shows a flowchart illustrating a method 1100 in accordance with aspects of the present disclosure. The operations of method 1100 may be implemented by an application server or its components as described herein. For example, the operations of method 1100 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 1105, the application server may identify, at an application enabler layer (e.g., a VAE layer), a congestion control configuration including capabilities for collecting operation information. The operations of 1105 may be performed according to the methods described herein. In some examples, aspects of the operations of 1105 may be performed by a VAE services manager as described with reference to FIGS. 5 through 8.

At 1110, the application server may receive, from a set of UEs, the operation information in accordance with the capabilities. The operations of 1110 may be performed according to the methods described herein. In some examples, aspects of the operations of 1110 may be performed by a congestion information collector as described with reference to FIGS. 5 through 8.

At 1115, the application server may generate congestion control instructions for one or more UEs of the set of UEs based on the received operation information. The operations of 1115 may be performed according to the methods described herein. In some examples, aspects of the operations of 1115 may be performed by a congestion controller as described with reference to FIGS. 5 through 8.

At 1120, the application server may transmit the congestion control instructions to a UE of the set of UEs, the UE being within network coverage. The operations of 1120 may be performed according to the methods described herein. In some examples, aspects of the operations of 1120 may be performed by a control instruction component as described with reference to FIGS. 5 through 8.

Figure 12:
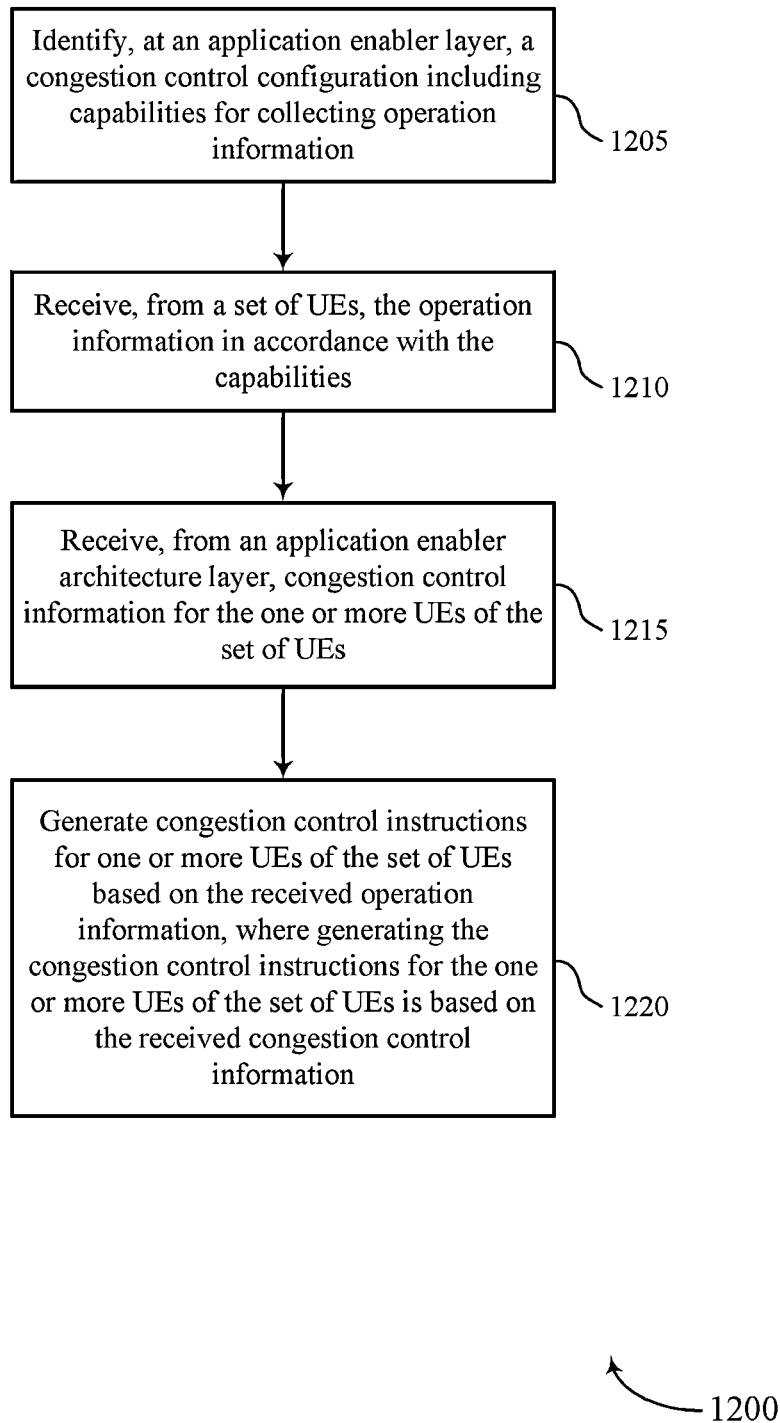

FIG. 12 shows a flowchart illustrating a method 1200 in accordance with aspects of the present disclosure. The operations of method 1200 may be implemented by an application server or its components as described herein. For example, the operations of method 1200 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 1205, the application server may identify, at an application enabler layer, a congestion control configuration including capabilities for collecting operation information. The operations of 1205 may be performed according to the methods described herein. In some examples, aspects of the operations of 1205 may be performed by a VAE services manager as described with reference to FIGS. 5 through 8.

At 1210, the application server may receive, from a set of UEs, the operation information in accordance with the capabilities. The operations of 1210 may be performed according to the methods described herein. In some examples, aspects of the operations of 1210 may be performed by a congestion information collector as described with reference to FIGS. 5 through 8.

At 1215, the application server may receive, from an application enabler architecture layer (e.g., a SEAL layer), congestion control information for the one or more UEs of the set of UEs. The operations of 1215 may be performed according to the methods described herein. In some examples, aspects of the operations of 1215 may be performed by a SEAL interface as described with reference to FIGS. 5 through 8.

At 1220, the application server may generate congestion control instructions for one or more UEs of the set of UEs based on the received operation information, where generating the congestion control instructions for the one or more UEs of the set of UEs is based on the received congestion control information. The operations of 1220 may be performed according to the methods described herein. In some examples, aspects of the operations of 1220 may be performed by a congestion controller as described with reference to FIGS. 5 through 8.

Figure 13:
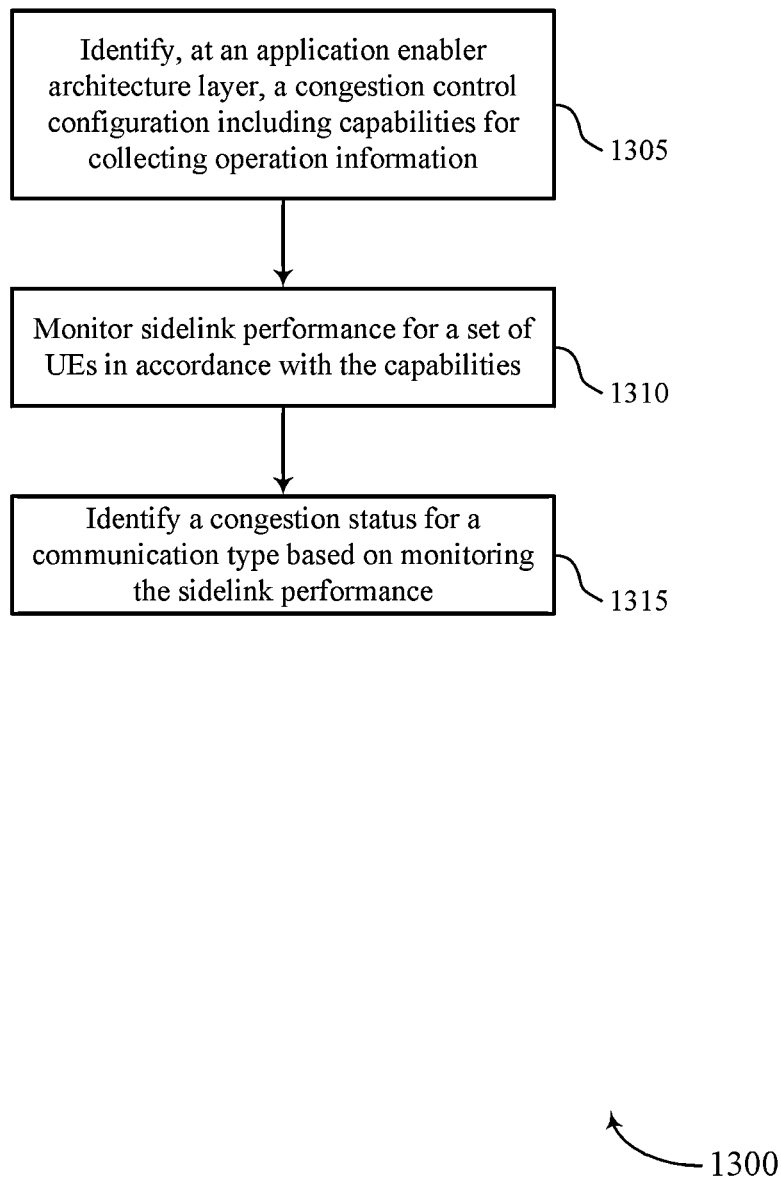

FIG. 13 shows a flowchart illustrating a method 1300 in accordance with aspects of the present disclosure. The operations of method 1300 may be implemented by an application server or its components as described herein. For example, the operations of method 1300 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 1305, the application server may identify, at an application enabler architecture layer (e.g., by executing instructions associated with the application enabler architecture layer), a congestion control configuration including capabilities for collecting operation information. The operations of 1305 may be performed according to the methods described herein. In some examples, aspects of the operations of 1305 may be performed by a SEAL services manager as described with reference to FIGS. 5 through 8.

At 1310, the application server may monitor sidelink performance for a set of UEs in accordance with the capabilities. The operations of 1310 may be performed according to the methods described herein. In some examples, aspects of the operations of 1310 may be performed by a sidelink performance component as described with reference to FIGS. 5 through 8.

At 1315, the application server may identify a congestion status for a communication type based on monitoring the sidelink performance. The operations of 1315 may be performed according to the methods described herein. In some examples, aspects of the operations of 1315 may be performed by a congestion controller as described with reference to FIGS. 5 through 8.

Figure 14:
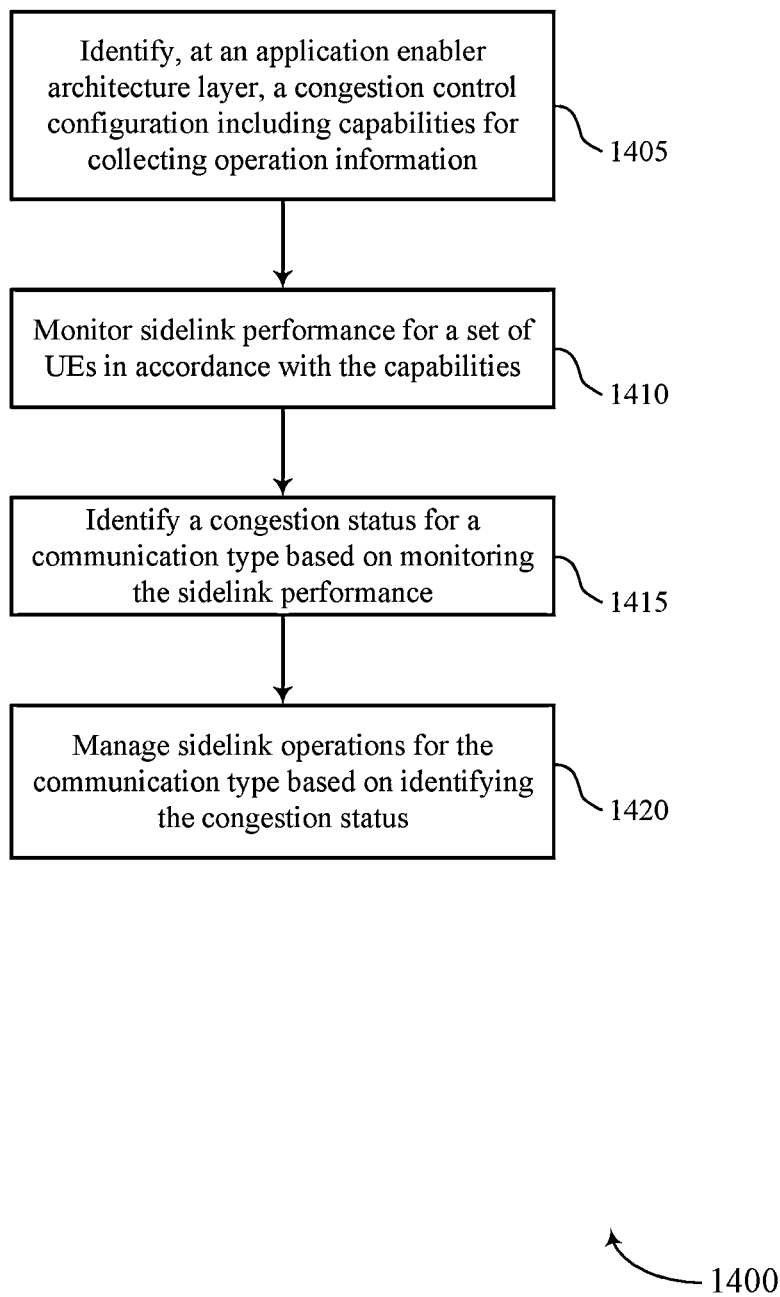

FIG. 14 shows a flowchart illustrating a method 1400 in accordance with aspects of the present disclosure. The operations of method 1400 may be implemented by an application server or its components as described herein. For example, the operations of method 1400 may be performed by a communications manager as described with reference to FIGS. 5 through 8. In some examples, an application server may execute a set of instructions to control the functional elements of the application server to perform the functions described below. Additionally or alternatively, an application server may perform aspects of the functions described below using special-purpose hardware.

At 1405, the application server may identify, at an application enabler architecture layer, a congestion control configuration including capabilities for collecting operation information. The operations of 1405 may be performed according to the methods described herein. In some examples, aspects of the operations of 1405 may be performed by a SEAL services manager as described with reference to FIGS. 5 through 8.

At 1410, the application server may monitor sidelink performance for a set of UEs in accordance with the capabilities. The operations of 1410 may be performed according to the methods described herein. In some examples, aspects of the operations of 1410 may be performed by a sidelink performance component as described with reference to FIGS. 5 through 8.

At 1415, the application server may identify a congestion status for a communication type based on monitoring the sidelink performance. The operations of 1415 may be performed according to the methods described herein. In some examples, aspects of the operations of 1415 may be performed by a congestion controller as described with reference to FIGS. 5 through 8.

At 1420, the application server may manage sidelink operations for the communication type based on identifying the congestion status. The operations of 1420 may be performed according to the methods described herein. In some examples, aspects of the operations of 1420 may be performed by a sidelink manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications, comprising:
    identifying, at an application enabler layer, a congestion control configuration comprising capabilities for collecting operation information;
    transmitting, to a subset of a plurality of user equipments (UEs) within network coverage, an operation information request and a reporting configuration for reporting the operation information, wherein the reporting configuration comprises relay instructions based at least in part on a coverage level of each of the plurality of UEs;
    receiving, from the plurality of UEs, the operation information in accordance with the capabilities, wherein receiving the operation information is based at least in part on the operation information request; and
    generating instructions for one or more UEs of the plurality of UEs based at least in part on the received operation information.

2. The method of claim 1, wherein the reporting configuration comprises aggregation instructions associated with the relay instructions.

3. The method of claim 1, further comprising:
    detecting congestion for a service type based at least in part on the received operation information, wherein the instructions for the one or more UEs of the plurality of UEs are associated with the service type and based at least in part on the detected congestion.

4. The method of claim 1, further comprising:
    transmitting the instructions to a UE of the plurality of UEs, the UE being within the network coverage.

5. The method of claim 4, wherein transmitting the instructions further comprises:
    transmitting, to the UE, an instruction distribution configuration for relaying the instructions.

6. The method of claim 4, wherein transmitting the instructions further comprises:
    transmitting, to the UE, an instruction distribution configuration via a user plane, a control plane, system information, radio resource control signaling, or a combination thereof.

7. The method of claim 1, further comprising:
    receiving, from an application enabler architecture layer, congestion control information for the one or more UEs of the plurality of UEs, wherein generating the instructions for the one or more UEs of the plurality of UEs is based at least in part on the received congestion control information.

8. The method of claim 1, further comprising:
    identifying an operation information map based at least in part on the received congestion control information; and
    transmitting, to a subset of the plurality of UEs within the network coverage, an operation information trigger with the relay instructions based at least in part on the operation information map.

9. The method of claim 1, wherein the operation information comprises location specific application information, sidelink group specific information, vehicle-to-everything service specific information, UE movement information, or a combination thereof.

10. The method of claim 1, wherein the instructions comprise a message generation rate adjustment, an application communication mode adjustment, a prioritization of lower layer communication types, or a combination thereof.

11. The method of claim 1, wherein the application enabler layer comprises a vehicle-to-everything application enabler layer in communication with a common vehicle-to-everything server shared by a plurality of public land mobile networks or a vehicle-to-everything server on a user plane accessible from each of the plurality of public land mobile networks.

12. The method of claim 1, wherein identifying, at the application enabler layer, the congestion control configuration comprising the capabilities for collecting operation information in the application enabler layer comprises:
    executing instructions associated with the application enabler layer at an application server to identify the congestion control configuration, wherein the application enabler layer comprises a vehicle-to-everything application enabler layer.

13. A method for wireless communications, comprising:

identifying, at an application enabler architecture layer, a congestion control configuration comprising capabilities for collecting operation information;
monitoring sidelink performance for a plurality of user equipments (UEs) in accordance with the capabilities;
receiving, from a UE of the plurality of UEs, one or more sidelink status reports, wherein the one or more sidelink status reports includes aggregated status reports from each UE of the plurality of UEs; and
identifying a congestion status for a communication type based at least in part on monitoring the sidelink performance.

14. The method of claim 13, further comprising:
managing sidelink operations for the communication type based at least in part on identifying the congestion status.

15. The method of claim 13, further comprising:
transmitting, to an application enabler layer, congestion control information for one or more UEs of the plurality of UEs based at least in part on identifying the congestion status.

16. The method of claim 15, further comprising:
receiving, from the application enabler layer, instructions for the one or more UEs of the plurality of UEs based at least in part on transmitting the congestion control information.

17. The method of claim 16, wherein the instructions comprises a prioritization of lower layer communication types.

18. The method of claim 15, wherein the congestion control information comprises a lower layer communication type.

19. The method of claim 13, wherein identifying the congestion status of the communication type further comprises:
identifying potential congestion of the communication type based at least in part on a prediction based on monitoring the sidelink performance; and
transmitting, to an application enabler layer, congestion control information for one or more UEs of the plurality of UEs based at least in part on identifying the potential congestion status.

20. The method of claim 13, wherein
the UE relays the one or more sidelink status reports from one or more out of coverage UEs of the plurality of UEs.

21. The method of claim 13, further comprising:
identifying a status information map based at least in part on monitoring the sidelink performance; and
transmitting, to a subset of the plurality of UEs within network coverage, a performance information request with relay instructions based at least in part on the status information map.

22. The method of claim 13, wherein the sidelink performance comprises sidelink communication status, sidelink communication statistics, sidelink quality of service information, or a combination thereof.

23. The method of claim 13, wherein an application enabler layer comprises a vehicle-to-everything application enabler layer in communication with a common vehicle-to-everything server shared by a plurality of public land mobile networks or a vehicle-to-everything server on a user plane accessible from each of the plurality of public land mobile networks.

24. The method of claim 13, wherein identifying, at the application enabler architecture layer, the congestion control configuration comprising the capabilities for collecting operation information in the application enabler architecture layer comprises:
executing instructions associated with the application enabler architecture layer at an application server to identify the congestion control configuration, wherein the application enabler architecture layer comprises a service enabler architecture layer for verticals comprising an inter-server interface.

25. An apparatus for wireless communications, comprising:
one or more processors,
one or more memories coupled with the one or more processors; and
instructions stored in the one or more memories and executable by the one or more processors to cause the apparatus to:
identify, at an application enabler layer, a congestion control configuration comprising capabilities for collecting operation information;
transmit, to a subset of a plurality of user equipments (UEs) within network coverage, an operation information request and a reporting configuration for reporting the operation information, wherein the reporting configuration comprises relay instructions based at least in part on a coverage level of each of the plurality of UEs;
receive, from the plurality of UEs, the operation information in accordance with the capabilities, wherein receiving the operation information is based at least in part on the operation information request; and
generate instructions for one or more UEs of the plurality of UEs based at least in part on the received operation information.

26. The apparatus of claim 25, wherein the instructions are further executable by the one or more processors to:
detect congestion for a service type based at least in part on the received operation information, wherein the instructions for the one or more UEs of the plurality of UEs are associated with the service type and based at least in part on the detected congestion.

27. The apparatus of claim 25, wherein the instructions are further executable by the one or more processors to:
receive, from an application enabler architecture layer, congestion control information for the one or more UEs of the plurality of UEs, wherein generating the instructions for the one or more UEs of the plurality of UEs is based at least in part on the received congestion control information.

28. An apparatus for wireless communications, comprising:
one or more processors,
one or more memories coupled with the one or more processors; and
instructions stored in the one or more memories and executable by the one or more processors to cause the apparatus to:
identify, at an application enabler architecture layer, a congestion control configuration comprising capabilities for collecting operation information;
monitor sidelink performance for a plurality of user equipments (UEs) in accordance with the capabilities;
receive, from a UE of the plurality of UEs, one or more sidelink status reports, wherein the one or more sidelink status reports includes aggregated status reports from each UE of the plurality of UEs; and identify a congestion status for a communication type based at least in part on monitoring the sidelink performance.

29. The apparatus of claim 28, wherein the instructions are further executable by the one or more processors to:
manage sidelink operations for the communication type based at least in part on identifying the congestion status.

30. The apparatus of claim 28, wherein the instructions are further executable by the one or more processors to:
transmit, to an application enabler layer, congestion control information for one or more UEs of the plurality of UEs based at least in part on identifying the congestion status.

31. A non-transitory computer-readable medium storing code for wireless communications, the code comprising instructions executable by a processor to:
identify, at an application enabler layer, a congestion control configuration comprising capabilities for collecting operation information;
transmit, to a subset of a plurality of user equipments (UEs) within network coverage, an operation information request;
receive, from the plurality of UEs, the operation information in accordance with the capabilities, wherein receiving the operation information is based at least in part on the operation information request; and
generate instructions for one or more UEs of the plurality of UEs based at least in part on the received operation information.

* * * * *